(12) United States Patent
Larcheveque et al.

(10) Patent No.: US 8,046,683 B2
(45) Date of Patent: *Oct. 25, 2011

(54) STRUCTURAL EDITING WITH SCHEMA AWARENESS

(75) Inventors: Jean-Marie H. Larcheveque, Bellevue, WA (US); Anand Ramagopalrao, Bellevue, WA (US); Michael B. Palmer, Snohomish, WA (US); Alessandro Catorcini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

This patent is subject to a terminal disclaimer.

(21) Appl. No.: 12/360,115

(22) Filed: Jan. 27, 2009

(65) Prior Publication Data

US 2009/0138790 A1    May 28, 2009

Related U.S. Application Data

(63) Continuation of application No. 10/837,443, filed on Apr. 29, 2004, now Pat. No. 7,496,837.

(51) Int. Cl.
*G06F 17/00* (2006.01)
(52) U.S. Cl. ........................................ 715/237; 715/234
(58) Field of Classification Search .................. 715/237, 715/234, 221–225, 255; 707/100
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |

(Continued)

FOREIGN PATENT DOCUMENTS

EP    0841615    11/1999

(Continued)

OTHER PUBLICATIONS

"Efficient schemes for managing multiversion XML documents", VLDB Journal, 2002, pp. 332-352. (The corresponding document was previously submitted in connection with parent U.S. Appl. No. 10/837,443 and is not being resubmitted herewith per 37 CFR 1.98(d).).

(Continued)

*Primary Examiner* — Stephen Hong
*Assistant Examiner* — Manglesh Patel

(57) ABSTRACT

A markup language document has data entry fields corresponding to markup language nodes that are arranged in a hierarchical structure of parents having child nodes. The hierarchical position of each markup language node in the hierarchical structure is expressed as a corresponding fragment of the markup language. For each parent, a markup language fragment is formed so as to have a plurality of portions each corresponding to the fragment of a respective child node without repeating any fragment of the respective child nodes. Portions that respectively correspond to the child nodes are used for data entry with the data entry fields, where an electronic form is displayed on a user interface for interactive data entry. The electronic form has one or more data entry fields each corresponding to one of the data entry fields of the structured markup language document and into which data can be entered.

37 Claims, 11 Drawing Sheets

U.S. PATENT DOCUMENTS

| | | |
|---|---|---|
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright et al. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,038,179 A | 3/2000 | Eustis et al. |
| 6,044,205 A | 3/2000 | Reed et al. |
| 6,052,531 A | 4/2000 | Waldin, Jr. et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |

| | | | |
|---|---|---|---|
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,273 B1 | 10/2001 | Goertzel et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,149 B1 | 1/2002 | Motoiwa |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,405,221 B1 | 6/2002 | Levine et al. |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,539,403 B2 | 3/2003 | Cho et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,662,340 B2 | 12/2003 | Rawat et al. |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,818 B2 | 2/2004 | Li et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,728,755 B1 | 4/2004 | de Ment |
| 6,731,732 B2 | 5/2004 | Creamer et al. |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,868 B1 | 6/2004 | Glaser et al. |

| Patent Number | Date | Inventor(s) |
|---|---|---|
| 6,760,723 B2 | 7/2004 | Oshinsky et al. |
| 6,763,343 B1 | 7/2004 | Brooke et al. |
| 6,765,559 B2 | 7/2004 | Hayakawa |
| 6,771,286 B2 | 8/2004 | Emrani |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,783,060 B2 | 8/2004 | Marappan |
| 6,799,299 B1 | 9/2004 | Li et al. |
| 6,801,929 B1 | 10/2004 | Donoho et al. |
| 6,806,890 B2 | 10/2004 | Audleman et al. |
| 6,816,849 B1 | 11/2004 | Halt, Jr. |
| 6,822,663 B2 | 11/2004 | Wang et al. |
| 6,826,568 B2 | 11/2004 | Bernstein et al. |
| 6,826,726 B2 | 11/2004 | Hsing et al. |
| 6,832,219 B2 | 12/2004 | Lal |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,939 B2 | 2/2005 | Bostleman et al. |
| 6,853,997 B2 | 2/2005 | Wotring et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,880,014 B2 | 4/2005 | Brown et al. |
| 6,882,996 B2 | 4/2005 | Preisig et al. |
| 6,889,359 B1 | 5/2005 | Conner et al. |
| 6,901,403 B1 | 5/2005 | Bata et al. |
| 6,904,588 B2 | 6/2005 | Reddy et al. |
| 6,915,454 B1 | 7/2005 | Moore et al. |
| 6,920,461 B2 | 7/2005 | Hejlsberg et al. |
| 6,931,532 B1 | 8/2005 | Davis et al. |
| 6,934,712 B2 | 8/2005 | Kiernan et al. |
| 6,934,910 B2 | 8/2005 | Lange |
| 6,941,510 B2 | 9/2005 | Ozzie et al. |
| 6,941,511 B1 | 9/2005 | Hind et al. |
| 6,948,133 B2 | 9/2005 | Haley |
| 6,948,135 B1 | 9/2005 | Ruthfield et al. |
| 6,950,533 B2 | 9/2005 | Zlotnick |
| 6,950,980 B1 | 9/2005 | Malcolm |
| 6,961,731 B2 | 11/2005 | Holbrook |
| 6,961,897 B1 | 11/2005 | Peel, Jr. et al. |
| 6,963,875 B2 | 11/2005 | Moore et al. |
| 6,965,390 B2 | 11/2005 | Alimpich et al. |
| 6,968,346 B2 | 11/2005 | Hekmatpour |
| 6,968,503 B1 | 11/2005 | Chang et al. |
| 6,968,505 B2 | 11/2005 | Stoll et al. |
| 6,975,914 B2 | 12/2005 | DeRemer et al. |
| 6,978,316 B2 | 12/2005 | Ghaffar et al. |
| 6,993,559 B2 | 1/2006 | Jilk, Jr. et al. |
| 6,993,714 B2 | 1/2006 | Kaler et al. |
| 6,996,773 B2 | 2/2006 | Friedman et al. |
| 6,996,776 B1 | 2/2006 | Makely et al. |
| 6,996,781 B1 | 2/2006 | Myers et al. |
| 7,003,722 B2 | 2/2006 | Rothchiller et al. |
| 7,010,580 B1 | 3/2006 | Fu et al. |
| 7,024,413 B2 | 4/2006 | Binding et al. |
| 7,032,170 B2 | 4/2006 | Poulose et al. |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,072,903 B2 | 7/2006 | Milleker et al. |
| 7,073,123 B2 | 7/2006 | Friedman et al. |
| 7,073,188 B2 | 7/2006 | Lemmons et al. |
| 7,080,083 B2 | 7/2006 | Kim et al. |
| 7,080,325 B2 | 7/2006 | Treibach-Heck et al. |
| 7,086,002 B2 | 8/2006 | Elo et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,111,286 B2 | 9/2006 | Schrader et al. |
| 7,117,216 B2 | 10/2006 | Chakraborty et al. |
| 7,120,699 B2 | 10/2006 | Stork et al. |
| 7,143,100 B2 | 11/2006 | Carlson et al. |
| 7,143,344 B2 | 11/2006 | Parker et al. |
| 7,146,564 B2 | 12/2006 | Kim et al. |
| 7,146,565 B2 | 12/2006 | Toyama et al. |
| 7,152,205 B2 | 12/2006 | Day et al. |
| 7,155,444 B2 | 12/2006 | Krishnan et al. |
| 7,168,035 B1 | 1/2007 | Bell et al. |
| 7,171,615 B2 | 1/2007 | Jensen et al. |
| 7,174,327 B2 | 2/2007 | Chau et al. |
| 7,188,160 B2 | 3/2007 | Champagne et al. |
| 7,190,376 B1 | 3/2007 | Tonisson |
| 7,191,394 B1 | 3/2007 | Ardeleanu et al. |
| 7,191,395 B2 | 3/2007 | Adler et al. |
| 7,194,730 B2 | 3/2007 | Pramberger |
| 7,200,645 B2 | 4/2007 | Brown et al. |
| 7,200,806 B2 | 4/2007 | Sahu |
| 7,203,927 B2 | 4/2007 | Al-Azzawe et al. |
| 7,206,998 B2 | 4/2007 | Pennell et al. |
| 7,213,200 B2 | 5/2007 | Abe et al. |
| 7,236,982 B2 | 6/2007 | Zlatanov et al. |
| 7,254,581 B2 | 8/2007 | Johnson et al. |
| 7,266,573 B2 | 9/2007 | Pecht-Seibert |
| 7,269,621 B2 | 9/2007 | Chang et al. |
| 7,272,258 B2 | 9/2007 | Berkner et al. |
| 7,272,789 B2 | 9/2007 | O'Brien |
| 7,275,087 B2 | 9/2007 | Vaschillo et al. |
| 7,275,216 B2 | 9/2007 | Paoli et al. |
| 7,281,013 B2 | 10/2007 | Chaudhuri et al. |
| 7,281,018 B1 | 10/2007 | Begun et al. |
| 7,281,245 B2 | 10/2007 | Reynar et al. |
| 7,296,017 B2 | 11/2007 | Larcheveque et al. |
| 7,302,436 B2 | 11/2007 | Qubti et al. |
| 7,305,612 B2 | 12/2007 | Chakraborty |
| 7,313,757 B2 | 12/2007 | Bradley et al. |
| 7,313,758 B2 | 12/2007 | Kozlov |
| 7,315,981 B2 | 1/2008 | Nakamura et al. |
| 7,316,003 B1 | 1/2008 | Dulepet et al. |
| 7,318,066 B1 | 1/2008 | Kaufman et al. |
| 7,318,237 B2 | 1/2008 | Moriconi et al. |
| 7,334,178 B1 | 2/2008 | Aulagnier |
| 7,346,532 B2 | 3/2008 | Kusama et al. |
| 7,346,598 B2 | 3/2008 | Arora et al. |
| 7,346,616 B2 | 3/2008 | Ramanujam et al. |
| 7,366,977 B2 | 4/2008 | Chokshi |
| 7,376,904 B2 | 5/2008 | Cifra et al. |
| 7,386,532 B2 | 6/2008 | Kiessig et al. |
| 7,412,651 B2 | 8/2008 | Lapstun et al. |
| 7,437,664 B2 | 10/2008 | Borson |
| 7,447,910 B2 | 11/2008 | Kisters |
| 7,457,810 B2 | 11/2008 | Breining et al. |
| 7,461,332 B2 | 12/2008 | Brintzenhofe et al. |
| 7,467,375 B2 | 12/2008 | Tondreau et al. |
| 2001/0054004 A1 | 12/2001 | Powers |
| 2002/0010743 A1 | 1/2002 | Ryan et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035581 A1 | 3/2002 | Reynar et al. |
| 2002/0057297 A1 | 5/2002 | Grimes et al. |
| 2002/0070973 A1 | 6/2002 | Croley |
| 2002/0078103 A1 | 6/2002 | Gorman et al. |
| 2002/0129056 A1 | 9/2002 | Conant et al. |
| 2002/0152244 A1 | 10/2002 | Dean et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0188597 A1 | 12/2002 | Kern et al. |
| 2002/0198935 A1 | 12/2002 | Crandall et al. |
| 2003/0018668 A1 | 1/2003 | Britton et al. |
| 2003/0020746 A1 | 1/2003 | Chen et al. |

| | | |
|---|---|---|
| 2003/0023641 A1 | 1/2003 | Gorman et al. |
| 2003/0025732 A1 | 2/2003 | Prichard |
| 2003/0037303 A1 | 2/2003 | Bodlaender et al. |
| 2003/0046665 A1 | 3/2003 | Ilin |
| 2003/0048301 A1 | 3/2003 | Menninger |
| 2003/0055828 A1 | 3/2003 | Koch et al. |
| 2003/0061567 A1 | 3/2003 | Brown et al. |
| 2003/0093755 A1 | 5/2003 | O'Carroll |
| 2003/0120578 A1 | 6/2003 | Newman |
| 2003/0120659 A1 | 6/2003 | Sridhar |
| 2003/0126555 A1 | 7/2003 | Aggarwal et al. |
| 2003/0135825 A1 | 7/2003 | Gertner et al. |
| 2003/0158897 A1 | 8/2003 | Ben-Natan et al. |
| 2003/0187756 A1 | 10/2003 | Klivington et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204511 A1 | 10/2003 | Brundage et al. |
| 2003/0217053 A1 | 11/2003 | Bachman et al. |
| 2003/0225829 A1 | 12/2003 | Pena et al. |
| 2003/0233374 A1 | 12/2003 | Spinola et al. |
| 2004/0003353 A1 | 1/2004 | Rivera et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0054966 A1 | 3/2004 | Busch et al. |
| 2004/0059754 A1 | 3/2004 | Barghout et al. |
| 2004/0073868 A1 | 4/2004 | Easter et al. |
| 2004/0078756 A1 | 4/2004 | Napper et al. |
| 2004/0088647 A1 | 5/2004 | Miller et al. |
| 2004/0093596 A1 | 5/2004 | Koyano |
| 2004/0117769 A1 | 6/2004 | Lauzon et al. |
| 2004/0163041 A1 | 8/2004 | Engel |
| 2004/0172442 A1 | 9/2004 | Ripley |
| 2004/0186762 A1 | 9/2004 | Beaven et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0221245 A1 | 11/2004 | Chickles et al. |
| 2004/0237030 A1 | 11/2004 | Malkin |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0033728 A1 | 2/2005 | James et al. |
| 2005/0038711 A1 | 2/2005 | Marlelo |
| 2005/0055627 A1 | 3/2005 | Lloyd et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0091305 A1 | 4/2005 | Lange et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0171746 A1 | 8/2005 | Thalhammer-Reyero |
| 2005/0198086 A1 | 9/2005 | Moore et al. |
| 2005/0198125 A1 | 9/2005 | Macleod Beck et al. |
| 2005/0198247 A1 | 9/2005 | Perry et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0085409 A1 | 4/2006 | Rys et al. |
| 2006/0101037 A1 | 5/2006 | Brill et al. |
| 2006/0143220 A1 | 6/2006 | Spencer, Jr. |
| 2006/0161559 A1 | 7/2006 | Bordawekar et al. |
| 2007/0036433 A1 | 2/2007 | Teutsch et al. |
| 2007/0050719 A1 | 3/2007 | Lui et al. |
| 2007/0061467 A1 | 3/2007 | Essey et al. |
| 2007/0061706 A1 | 3/2007 | Cupala et al. |
| 2007/0074106 A1 | 3/2007 | Ardeleanu et al. |
| 2007/0094589 A1 | 4/2007 | Paoli et al. |
| 2007/0100877 A1 | 5/2007 | Paoli et al. |
| 2007/0101280 A1 | 5/2007 | Paoli et al. |
| 2007/0118803 A1 | 5/2007 | Walker et al. |
| 2007/0130504 A1 | 6/2007 | Betancourt et al. |
| 2007/0208606 A1 | 9/2007 | Mackay et al. |
| 2007/0208769 A1 | 9/2007 | Boehm et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | 9924945 | 5/1999 |
| WO | 9956207 | 11/1999 |
| WO | 0144934 | 6/2001 |
| WO | 0157720 | 8/2001 |

OTHER PUBLICATIONS

"Storing and Querying Multiversion XML Documents using Durable Node Numbers", IEEE 2002, pp. 232-241. (The corresponding document was previously submitted in connection with parent U.S. Appl. No. 10/837,443 and is not being resubmitted herewith per 37 CFR 1.98(d).).

"XML Document Versioning", SIGMOD Record, vol. 30, No. 3, Sep. 2001, pp. 46-53. (The corresponding document was previously submitted in connection with parent U.S. Appl. No. 10/837,443 and is not being resubmitted herewith per 37 CFR 1.98(d).).

"Generic Validation of Structural Content with Parametric Modules", ICFP '01, Sep. 3-5, 2001, Copyright 2001, ACM 1-58113-415-0/01/0009, pp. 98-109. (The corresponding document was previously submitted in connection with parent U.S. Appl. No. 10/837,443 and is not being resubmitted herewith per 37 CFR 1.98(d).).

"Managing Complex Documents Over the WWW: A Case Study for XML" IEEE Transactions on Knowledge and Data Engineering vol. 11, No. 4, Jul./Aug. 1999, pp. 629-938. (The corresponding document was previously submitted in connection with parent U.S. Appl. No. 10/837,443 and is not being resubmitted herewith per 37 CFR 1.98(d).).

Clapp D., "The NeXT Application Kit Part I: Non-Responsive Classes", The NeXT Bible 1990, Chapter 16, pp. 275-293. (The corresponding document was previously submitted in connection with parent U.S. Appl. No. 10/837,443 and is not being resubmitted herewith per 37 CFR 1.98(d).).

Clark James—W3C Editor, "XSL Transformation (XSLT) Verison 1.0", Nov. 16, 1999, W3C (MIT INRIA Kejo), pp. 1-156. (The corresponding document was previously submitted in connection with parent U.S. Appl. No. 10/837,443 and is not being resubmitted herewith per 37 CFR 1.98(d).).

W3C Editor James Clark and Ste, "XML Path Language (XPath) Version 1.0", Nov. 16, 1999, W3C (MIT INRIA Kejo), pp. 1-49. (The corresponding document was previously submitted in connection with parent U.S. Appl. No. 10/837,443 and is not being resubmitted herewith per 37 CFR 1.98(d).).

"From small beginnings", Knowledge Management, Nov. 2001, pp. 28-30. (The corresponding document was previously submitted in connection with parent U.S. Appl. No. 10/837,443 and is not being resubmitted herewith per 37 CFR 1.98(d).).

"XML Editors: Allegations of Functionality in search of reality", Internet 'Online! 1999 XP002230082 retrieved from the Internet <URL:http://www.ivritype.com/xml/>. (The corresponding document was previously submitted in connection with parent U.S. Appl. No. 10/837,443 and is not being resubmitted herewith per 37 CFR 1.98(d).).

"Photo Shop 5/5.5 WOW! Book", 2000 Peachpit Press, pp. 8-17. (The corresponding document was previously submitted in connection with parent U.S. Appl. No. 10/837,443 and is not being resubmitted herewith per 37 CFR 1.98 (d).).

Description of Whitehill Composer software product producted by Whitehill Technologies Inc. available at <http://www.xml.com/pub/p/221>, accessed on Apr. 8, 2004, pp. 2. (The corresponding document was previously submitted in connection with parent U.S. Appl. No. 10/837,443 and is not being resubmitted herewith per 37 CFR 1.98(d).).

Dilascia, et al., "Sweeper", Microsoft Interactive Developer, vol. 1, No. 1, 1996, pp. 27. (The corresponding document was previously submitted in connection with parent U.S. Appl. No. 10/837,443 and is not being resubmitted herewith per 37 CFR 1.98(d).).

"XML Spy Tops as XML Editor", http://www.eweek.com/article2/0395972404100.asp, Nov. 25, 2002, pp. 4. (The corresponding document was previously submitted in connection with parent U.S. Appl. No. 10/837,443 and is not being resubmitted herewith per 37 CFR 1.98(d).).

"Agent-based Software Configuration and Deployment", Thesis of the University of Colorado Online '31, Dec. 1999, retrieved from the Internet on Nov. 7, 2003, <http://www.cs.colorado.edu/users/rickhall/documents/ThesisFinal.pdf>, pp. 169. (The corresponding document was previously submitted in connection with parent U.S. Appl. No. 10/837,443 and is not being resubmitted herewith per 37 CFR 1.98(d).) .

"Mapping and Displaying Structural Transformations between XML and PDF", DocEng '02, Nov. 8-9, 2002, Copyright 2002, ACM 1-58113-597-7/02/0011, pp. 95-102. (The corresponding document was previously submitted in connection with parent U.S. Appl. No. 10/837,443 and is not being resubmitted herewith per 37 CFR 1.98 (d).) .

"Tsbiff-tildeslash biff—version 1.2.1", Internet Document [Online], Jun. 1999, URL: http:/lweb.archive.org/web/19990912001527/http://www.tildeslash.com/tsbiff/. (The corresponding document was previously submitted in connection with parent U.S. Appl. No. 10/837,443 and is not being resubmitted herewith per 37 CFR 1.98(d).).

Herzner, et al., "CDAM—Compound Document Access and Management. An Object-Oriented Approach", Multimedia Systems Interaction and Applications, 1992, Chapter 3, pp. 17-36. (The corresponding document was previously submitted in connection with parent U.S. Appl. No. 10/837,443 and is not being resubmitted herewith per 37 CFR 1.98(d).) .

"Micro-Firewalls for Dynamic Network Security with Distributed Intrusion Detection", IEEE INternational Symposium on Network Computing and Applications, 2001, pp. 68-79. (The corresponding document was previously submitted in connection with parent U.S. Appl. No. 10/837,443 and is not being resubmitted herewith per 37 CFR 1.98(d).).

"Specifying Runtime Environments and Functionalities of Downloadable Components Under the Sandbox Mode", International Symposium on Principles of Software Evolution, 2000, pp. 138-142. (The corresponding document was previously submitted in connection with parent U.S. Appl. No. 10/837,443 and is not being resubmitted herewith per 37 CFR 1.98(d).).

"An Efficiently Updatable Index Scheme for Structured Documents", 1998, IEEE, pp. 991-996. (The corresponding document was previously submitted in connection with parent U.S. Appl. No. 10/837,443 and is not being resubmitted herewith per 37 CFR 1.98(d).).

"Immediate and Partial Validation Mechanism for the Conflict Resolution of Update Operations in XML Databases", WAIM 2002 LNCS 2419 2002, pp. 387-396, Springer-Veriag, Berlin, Heidelberg 2002. (The corresponding document was previously submitted in connection with parent U.S. Appl. No. 10/837,443 and is not being resubmitted herewith per 37 CFR 1.98(d).).

Kobayashi, et al., "An Update on BTRON-specification OS Development", IEEE 1991, pp. 132-140. (The corresponding document was previously submitted in connection with parent U.S. Appl. No. 10/837,443 and is not being resubmitted herewith per 37 CFR 1.98(d).).

Komatsu, et al., "A Proposal on Digital Watermark in Document Image Communication and its Application to Realizing a Signature", Electronics and Communications in Japan Part I: Communications vol. 73, No. 5, May 1990, pp. 22-33. (The corresponding document was previously submitted in connection with parent U.S. Appl. No. 10/837,443 and is not being resubmitted herewith per 37 CFR1.98(d).).

McCright J.S., "New Tool Kit to Link Groove with Microsoft Sharepoint", eWeek Enterprise News & Reviews Ziff Davis Media Inc., Jul. 29, 2002. (The corresponding document was previously submitted in connection with parent U.S. Appl. No. 10/837,443 and is not being resubmitted herewith per 37 CFR 1.98(d).).

Musgrave S., "Networking technology—impact and opportunities", Survey and Statistical Computing1996., Proceedings of the Second ASC International Conference, Sep. 1996, pp. 369-378, London UK. (The corresponding document was previously submitted in connection with parent U.S. Appl. No. 10/837,443 and is not being resubmitted herewith per 37 CFR 1.98(d).).

"Validation with MSXML and XML Schema", Windows Developer Magazine, Jan. 2002, pp. 35-38. (The corresponding document was previously submitted in connection with parent U.S. Appl. No. 10/837,443 and is not being resubmitted herewith per 37 CFR 1.98(d).).

"SmartUpdate Developer's Guide", Online Mar. 11, 1999 retrieved from the Internet on Dec. 8, 2000: <http://developer.netscape.com:80/docs/manuals/communicator/jarman/index.htm>, pp. 83. (The corresponding document was previously submitted in connection with parent U.S. Appl. No. 10/837,443 and is not being resubmitted herewith per 37 CFR 1.98(d).).

"Netscape Communicator 4.61 for OS/2 Warp", Software 1999 the whole software release & "Netscape—Version 4.6 [en]-010615", NETSCAPE SCREENHOT, Oct. 2, 2002. (The corresponding document was previously submitted in connection with parent U.S. Appl. No. 10/837,443 and is not being resubmitted herewith per 37 CFR 1.98(d).).

"A secure conditional access system using digital signature and encryption", 2003 Digest of Technical Papers. International Conference on Consumer Electronics Jun. 2003, pp. 220-221. (The corresponding document was previously submitted in connection with parent U.S. Appl. No. 10/837,443 and is not being resubmitted herewith per 37 CFR 1.98(d).).

Object Management Group, XML Metadata Interchange (XMI) Specification Version 1:2, Jan. 2002. (The corresponding document was previously submitted in connection with parent U.S. Appl. No. 10/837,443 and is not being resubmitted herewith per 37 CFR 1.98(d).).

"Delphi 5 Developer's Guide", Sams Publishing, 1999, Chapter 31 Section: Data Streaming, pp. 6. (The corresponding document was previously submitted in connection with parent U.S. Appl. No. 10/837,443 and is not being resubmitted herewith per 37 CFR 1.98(d).).

Peterson B., "Unix Variants", Unix Review, vol. 10, No. 4, Apr. 1992, pp. 29-31. (The corresponding document was previously submitted in connection with parent U.S. Appl. No. 10/837,443 and is not being resubmitted herewith per 37 CFR 1.98(d).).

Pike et al., "Plan 9 from Bell Labs", UKUUG, Summer 1990, pp. 10. (The corresponding document was previously submitted in connection with parent U.S. Appl. No. 10/837,443 and is not being resubmitted herewith per 37 CFR 1.98 (d).).

Pike et al., "The Use of Name Spaces in Plan 9", Operating Systems Review, vol. 27, No. 2, Apr. 1993, pp. 72-76. (The corresponding document was previously submitted in connection with parent U.S. Appl. No. 10/837,443 and is not being resubmitted herewith per 37 CFR 1.98(d).).

Prevelakis, et al., "Sandboxing Applications", Proceedings of the FREENIX Track, 2001, pp. 119-126. (The corresponding document was previously submitted in connection with parent U.S. Appl. No. 10/837,443 and is not being resubmitted herewith per 37 CFR 1.98(d).).

Rapaport L, "Get more from SharePoint", Transform Magazine, vol. 11, No. 3, Mar. 2002, p. 1315. (The corresponding document was previously submitted in connection with parent U.S. Appl. No. 10/837,443 and is not being resubmitted herewith per 37 CFR 1.98(d).).

"Validating MPEG-21 Encapsulated Functional Metadata", IEEE 2002, pp. 209-212. (The corresponding document was previously submitted in connection with parent U.S. Appl. No. 10/837,443 and is not being resubmitted herewith per 37 CFR 1.98(d).).

Schmid, et al., "Protecting Data from Malicious Software", 18th Annual Computer Security Applications Conference, 2002, pp. 199-208. (The corresponding document was previously submitted in connection with parent U.S. Appl. No. 10/837,443 and is not being resubmitted herewith per 37 CFR 1.98(d).).

Staneck W., "Internal and External Media", Electronic Publishing Unleashed, 1995, Chapter 22, pp. 510-542. (The corresponding document was previously submitted in connection with parent U.S. Appl. No. 10/837,443 and is not being resubmitted herewith per 37 CFR 1.98(d).).

"Store and Organize Related Project Files in a Binder", Getting Results with Microsoft Office, 1990, pp. 109-112. (The corresponding document was previously submitted in connection with parent U.S. Appl. No. 10/837,443 and is not being resubmitted herewith per 37 CFR 1.98(d).).

Sun Q. et al.,"A robust and secure media signature schemefor JPEG images", Proceedings of 2002 IEEE Workshop on Multimedia Signal Processing, Dec. 2002, pp. 296-299. (The corresponding document was previously submitted in connection with parent U.S. Appl. No. 10/837,443 and is not being resubmitted herewith per 37 CFR 1.98 (d).).

"XFIG Version 3.2 Patchlevel 2 (Jul. 2, 1998) Users Manual (Edition 1.0)", Internet Document Online, Jul. 2, 1998 XP002229137, Retrieved from the Internet<URL: http://www.ice.mtu.edu/online_docslxfig332/>, retrieved on Jan. 28, 2003. (The corresponding document was previously submitted in connection with parent U.S. Appl. No. 10/837,443 and is not being resubmitted herewith per 37 CFR 1.98(d).).

"An Efficient and Flexible Access Control Framework for Java Programs in Mobile Terminals", 22nd International Conference on Distributed Computing Systems Workshops, 2002, pp. 777-782. (The corresponding document was previously submitted in connection with parent U.S. Appl. No. 10/837,443 and is not being resubmitted herewith per 37 CFR 1.98(d).).

Trupin J., "The Visual Programmer", Microsoft Systems Journal, Apr. 1996, pp. 103-105. (The corresponding document was previously submitted in connection with parent U.S. Appl. No. 10/837,443 and is not being resubmitted herewith per 37 CFR 1.98(d).).

"XML: Not a Silver Bullet But a Great Pipe Wrench", Standard view vol. 6, No. 3, Sep. 1998, pp. 125-132. (The corresponding document was previously submitted in connection with parent U.S. Appl. No. 10/837,443 and is not being resubmitted herewith per 37 CFR 1.98(d).).

"The Open Software Description Format", Online Aug. 13, 1997, retrieved from the Internet on Nov. 7, 2003: <http:// www.w3.org/TR/NOTE-OSD>, pp. 11. (The corresponding document was previously submitted in connection with parent U.S. Appl. No. 10/837,443 and is not being resubmitted herewith per 37 CFR 1.98(d).).

"Bridging XML-Schema and relational databases. A System for generating and manipulating relational databases using valid XML documents", DocEng'01, Nov. 9-10, 2001, Copyright 2001, ACM 1-58113-432-0/01/0011, pp. 105-114. (The corresponding document was previously submitted in connection with parent U.S. Appl. No. 10/837,443 and is not being resubmitted herewith per 37 CFR 1.98(d).).

"The Component Object Model, A Technical Overview" Oct. 1994, Microsoft Corporation, pp. 1-14. (The corresponding document was previously submitted in connection with parent U.S. Appl. No. 10/837,443 and is not being resubmitted herewith per 37 CFR 1.98(d).).

"Managing and Querying Multi-Version XML Data with Update Logging", DocEng'02, Nov. 8-9, 2002, Copyright 2002, ACM 1-58113-594-7/02/0011, pp. 74-81. (The corresponding document was previously submitted in connection with parent U.S. Appl. No.10/837,443 and is not being resubmitted herewith per 37 CFR 1.98(d).).

"Microsoft Word 2000 Screenshots", 2000, pp. 11-17. (The corresponding document was previously submitted in connection with parent U.S. Appl. No. 10/837,443 and is not being resubmitted herewith per 37 CFR 1.98(d).).

Xmlspy, "Xmlspy 2004 Enterprise Edition Manual", Altova, May 17, 2004, 1-25, 220-225. (The corresponding document was previously submitted in connection with parent U.S. Appl. No. 10/837,443 and is not being resubmitted herewith per 37 CFR 1.98(d).).

StylusStudio, "StylusStudio: XPath Tools", 2004-2007, StylusStudio, 1-14. (The corresponding document was previously submitted in connection with parent U.S. Appl. No. 10/837,443 and is not being resubmitted herewith per 37 CFR 1.98(d).).

Dodds, "Toward an XPath API", xml.com, May 7, 2001, 1-3. (The corresponding document was previously submitted in connection with parent U.S. Appl. No. 10/837,443 and is not being resubmitted herewith per 37 CFR 1.98(d).).

Altova, "Altova Tools for XPath 1.0/2.0", Altova, 1-12. (The corresponding document was previously submitted in connection with parent U.S. Appl. No. 10/837,443 and is not being resubmitted herewith per 37 CFR 1.98(d).).

"Microsoft Word 2000 Screenshots", Word, 2000, 1-17. (The corresponding document was previously submitted in connection with parent U.S. Appl. No. 10/837,443 and is not being resubmitted herewith per 37 CFR 1.98(d).).

Altova, et al., "User and Referencece Manual Version 4.4", www.xmlspy.com, May 24, 2007, 1-565. (The corresponding document was previously submitted in connection with parent U.S. Appl. No. 10/837,443 and is not being resubmitted herewith per 37 CFR 1.98(d).).

Pacheco, Xavier et al., "Delphi 5 Developer's Guide", Sams Publishing. Chapter 31, Section: Data Streaming, 1999, 4. (The corresponding document was previously submitted in connection with parent U.S. Appl. No. 10/837,443 and is not being resubmitted herewith per 37 CFR 1.98(d).).

Borland, Russo, "Running Microsoft Word 97", 314-315, 338, 361-362, 390 and 714-719. (The corresponding document was previously submitted in connection with parent U.S. Appl. No. 10/837,443 and is not being resubmitted herewith per 37 CFR 1.98(d).).

"Microsoft Word 2000", Screenshots, 1999,1-5. (The corresponding document was previously submitted in connection with parent U.S. Appl. No. 10/837,443 and is not being resubmitted herewith per 37 CFR 1.98(d).).

Beauchemin, Dave, "Using InfoPath to Create Smart Forms", Retrieved from the Internet at http:/www.microsoft.com/office/infopath/prodinfo/using.mspx on Jan. 21, 2007, Mar. 27, 2003. (The corresponding document was previously submitted in connection with parent U.S. Appl. No. 10/837,443 and is not being resubmitted herewith per 37 CFR1.98 (d).).

Begun, Andrew, et al., "Support and Troubleshooting for XML Schemas in InfoPath 2003", Microsoft Office InfoPath 2003 Technical Articles, Retrieved from the Internet at http://msdn2.microsoft.com/enus/library/aa168241(office.11,d=printer).aspx on Jan. 21, 2007, Aug. 2004. (The corresponding document was previously submitted in connection with parent U.S. Appl. No. 10/837,443 and is not being resubmitted herewith per 37 CFR 1.98(d).).

Dubinko, Micah, "XForms and Microsoft InfoPath", Retrieved from the Internet at http://www.xml.com/lpt/a/1311 on Jan. 21, 2007, Oct. 29, 2003. (The corresponding document was previously submitted in connection with parent U.S. Appl. No. 10/837,443 and is not being resubmitted herewith per 37 CFR 1.98(d).).

Udell, Jon, "InfoPath and XForms", Retrieved from the Internet at http://weblog.infoworld.com/udell/2003/02/26.html, Feb. 26, 2003.

(The corresponding document was previously submitted in connection with parent U.S. Appl. No. 10/837,443 and is not being resubmitted herewith per 37 CFR 1.98(d).).

Hoffman, Michael, "Architecture of Microsoft Office•InfoPath 2003", Microsoft Office InfoPath 2003 Technical Articles, Retrieved from the Internet at http://msdn2.microsoft.com/en-us/library/aa219024(office.11,d=printer).aspx on Jan. 21, 2007, Jun. 2003. (The corresponding document was previously submitted in connection with parent U.S. Appl. No. 10/837,443 and is not being resubmitted herewith per 37 CFR 1.98(d).).

Singh, Darshan, "Microsoft InfoPath 2003 by Example", Retrieved from the Internet at http://www.perfectxml.com/InfoPath.asp on Jan. 21, 2007, Apr. 20, 2003. (The corresponding document was previously submitted in connection with parent U.S. Appl. No. 10/837,443 and is not being resubmitted herewith per 37 CFR 1.98(d).).

Raman, T.V., et al., "XForms 1.0", (Dec. 2001), Section 1-12.2.3 & Appendices A-G. (The corresponding document was previously submitted in connection with parent U.S. Appl. No. 10/837,443 and is not being resubmitted herewith per 37 CFR 1.98(d).).

"Enter Key", Retrieved from the Internet at http://systems.webopedia.com/TERM/Enter_key.html on Dec. 20, 2006. (The corresponding document was previously submitted in connection with parent U.S. Appl. No. 10/837,443 and is not being resubmitted herewith per 37 CFR 1.98(d).).

Lehtonen, Miro, et al., "A Dynamic User Interface for Document Assembly", Department of Computer Science, University of Helsinki, Nov. 2002. (The corresponding document was previously submitted in connection with parent U.S. Appl. No. 10/837,443 and is not being resubmitted herewith per 37 CFR 1.98(d).).

Rees, Michael J., "Evolving the Browser Towards a Standard User Interface Architecture", School of Information Technology, Bond University, Australia, 2001. (The corresponding document was previously submitted in connection with parent U.S. Appl. No. 10/837,443 and is not being resubmitted herewith per 37 CFR 1.98(d).).

"Microsoft Visual Basic 5.0 Programmer's Guide", Microsoft Press, 1997, pp. 42-43, 54-58. (The corresponding document was previously submitted in connection with parent U.S. Appl. No. 10/837,443 and is not being resubmitted herewith per 37 CFR 1.98(d).).

Nelson, Joe, "Client-side Form Validation Using JavaScript", Developer Advisory, Sep. 21, 2001. (The corresponding document was previously submitted in connection with parent U.S. Appl. No. 10/837,443 and is not being resubmitted herewith per 37 CFR 1.98(d).).

Barabrand, et al., Power Forms: "Declarative Client-side Form Field Validation", World Wide Web, Baltzer Science Publishers, Bussum, NL., vol. 3, No. 4, Dec. 2000, pp. 1-20. (The corresponding document was previously submitted in connection with parent U.S. Appl. No. 10/837,443 and is not being resubmitted herewith per 37 CFR 1.98(d).).

Anat, Eyal, et al., "Integrating and Customizing Hereogeneous E-Commerce Applications", The VLDB Journal—The International Journal on Very Large Data Bases, vol. 10, Issue 1, Aug. 2001,16-38. (The corresponding document was previously submitted in connection with parent U.S. Appl. No. 10/837,443 and is not being resubmitted herewith per 37 CFR 1.98(d).).

Adams, Susie, et al., "BizTalk Unleashed", Sams Publishing, 2002, First printing Mar. 2001, 1-2, 31-138. (The corresponding document was previously submitted in connection with parent U.S. Appl. No. 10/837,443 and is not being resubmitted herewith per 37 CFR 1.98(d).).

Vasters, Clemens F., "BizTalk Server 2000 A Beginner's Guide", Osborne/McGraw-Hill, 2001,1-2, 359-402. (The corresponding document was previously submitted in connection with parent U.S. Appl. No. 10/837,443 and is not being resubmitted herewith per 37 CFR 1.98(d).).

Halberg, Bruce, et al., "Using Microsoft Excel 97", 1997,191-201, 213- 219. (The corresponding document was previously submitted in connection with parent U.S. Appl. No. 10/837,443 and is not being resubmitted herewith per 37 CFR 1.98(d).).

Villard, et al., "An Incremental XSLT Transformation Processor for XML Document Manipulation", http://www2002.org/CDROM/refereed/321, Printed on May 18, 2007, May 2002, 25 Pages. (The corresponding document was previously submitted in connection with parent U.S. Appl. No. 10/837,443 and is not being resubmitted herewith per 37 CFR 1.98 (d).).

Atova, User Reference manual Version 4.4, XML Spy suite 4.4, Atova Ges.m.b.H and Altova, Inc., May 24, 2002, Pages cover, copyright page, 1-565. (The corresponding document was previously submitted in connection with parent U.S. Appl. No. 10/837,443 and is not being resubmitted herewith per 37 CFR 1.98(d).).

Altova, et al., XMLSpy, XML integrated Development Environments, Altova Inc., 2002, pp. 1-18. (The corresponding document was previously submitted in connection with parent U.S. Appl. No. 10/837,443 and is not being resubmitted herewith per 37 CFR 1.98(d).).

Ben-Natan, U.S. Appl. No. 60/203,081, filed May 19, 2000, entitled "Internet platform for creating and supporting communities". (The corresponding document was previously submitted in connection with parent U.S. Appl. No. 10/837,443 and is not being resubmitted herewith per 37 CFR 1.98(d).).

Ixia Soft, "Steamlining content creation, retrieval and publishing on the Web using TEXTML Server and SMLSpy 4 Suite in an integrated, Web publishing environment", (Partner's Whitepaper, published on the web as of Jun. 6, 2002, download pp. 1-16. (The corresponding document was previously submitted in connection with parent U.S. Appl. No. 10/837,443 and is not being resubmitted herewith per 37 CFR 1.98(d).).

Kutay, U.S. Appl. No. 60/209,713, filed Jun. 5, 2000, entitled, "Methods and systems for acccessing, organizing presenting and viewing data". (The corresponding document was previously submitted in connection with parent U.S. Appl. No. 10/837,443 and is not being resubmitted herewith per 37 CFR 1.98(d).).

Microsoft Word 2000 ( See Screen Shot "About Microsoft Word"), Published 1983-1999 and Microsoft Excel 2000 ( See Screen Shot "About Microsoft Excel"), Published 1988-1999, pp. 3. (The corresponding document was previously submitted in connection with parent U.S. Appl. No. 10/837,443 and is not being resubmitted herewith per 37 CFR 1.98(d).).

Moore, U.S. Appl. No. 60/191,662, filed Mar. 23, 2000, entitled "Collection-based presistent digital archives". (The corresponding document was previously submitted in connection with parent U.S. Appl. No. 10/837,443 and is not being resubmitted herewith per 37 CFR 1.98(d).).

Bruce Halberg et al., "Using Microsoft Excel 07", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714. (The corresponding document was previously submitted in connection with parent U.S. Appl. No. 10/837,443 and is not being resubmitted herewith per 37 CFR 1.98(d).).

Laura Acklen & Read Gilgen, "Using corel Wordperfect 9", 251-284,424-434,583-586,1998. (The corresponding document was previously submitted in connection with parent U.S. Appl. No. 10/837,443 and is not being resubmitted herewith per 37 CFR 1.98(d).).

Leblond, et al., "PC Magazine Guide to Quattro Pro for Windows", pp. 9-11, 42-61, Ziff-Davis Press, Copyright 1993 by the LeBlond Group. (The corresponding document was previously submitted in connection with parent U.S. Appl. No. 10/837,443 and is not being resubmitted herewith per 37 CFR 1.98(d).).

"Microsoft Visual Basic5.0 Programmer's Guide", 1997, pp. 578-579, Redmond, WA, 98052-6399. (The corresponding document was previously submitted in connection with parent U.S. Appl. No. 10/837,443 and is not being resubmitted herewith per 37 CFR 1.98(d).).

"Excel 97 for Busy People Published by Osborne/Mcgraw-Hill", 1997, pp. 48-50. (The corresponding document was previously submitted in connection with parent U.S. Appl. No. 10/837,443 and is not being resubmitted herewith per 37 CFR 1.98(d).).

"A tour of Xmetal" O'Reilly XML.COM 'Online Jul. 14, 1999 XP002230081, retrieved from the internet: <URL: http://www.xml.com/pub/a/SeyboldReport/ip0311025.html>, retrieved on Feb. 5, 2003. (The corresponding document was previously submitted in connection with parent U.S. Appl. No. 10/837,443 and is not being resubmitted herewith per 37 CFR 1.98(d).).

"Architecture for a Dynamic Information Area Control", IBM Technical Disclosure Bulletin IBM Corp. NewYork, US, vol. 37, No. 10, Jan. 10, 1994, pp. 245-246. (The corresponding document was previously submitted in connection with parent U.S. Appl. No. 10/837,443 and is not being resubmitted herewith per 37 CFR 1.98(d).).

"Netscape Communicator's CollapsibleToolbars", CHI'98 Human Factors in Computing Systems Conference Proceedings, Los Angeles, CA, Apr. 18-23, 1998, pp. 81-86. (The corresponding document was previously submitted in connection with parent U.S. Appl. No. 10/837,443 and is not being resubmitted herewith per 37 CFR 1.98(d).).

Barker, et al., "Creating In-Line Objects Within an Integrated Editing Environment", IBM Technical Disclosure Bulletin, vol. 27, No. 5, Oct. 1984, p. 2962. (The corresponding document was previously submitted in connection with parent U.S. Appl. No. 10/837,443 and is not being resubmitted herewith per 37 CFR 1.98(d).).

"Flexible Information Presentation with XML", 1998, The Institution of Electrical Engineers 6 pages. (The corresponding document was previously submitted in connection with parent U.S. Appl. No. 10/837,443 and is not being resubmitted herewith per 37 CFR 1.98(d).).

Berg A., "Naming and Binding: Monikers", Inside OLE, 1995, Chapter 9, pp. 431-490. (The corresponding document was previously submitted in connection with parent U.S. Appl. No. 10/837,443 and is not being resubmitted herewith per 37 CFR 1.98(d).).

"Arbortext Adept 8 Editor Review", O'Reilly XML.COM 'Online! Sep. 22, 1999 XP002230080 retrieved from the internet <URL:http://www.xml.com/pub/a/1999/09/adept/AdeptRvw.htm>, retrieved on Feb. 5, 2003. (The corresponding document was previously submitted in connection with parent U.S. Appl. No. 10/837,443 and is not being resubmitted herewith per 37 CFR 1.98(d).).

"XKvalidator: A Constraint Validator for XML", CIKM '-2, Nov. 4-9, 2002, Copyright 2002 ACM, 1-58, 113-492, 4/02/0011, pp. 446-452. (The corresponding document was previously submitted in connection with parent U.S. Appl. No. 10/837,443 and is not being resubmitted herewith per 37 CFR 1.98(d).).

"Designing Valid XML Views", ER 2002 LNCS 2503 2002, Springer-Verlag Berlin Heidelberg, 2002, pp. 463-477. (The corresponding document was previously submitted in connection with parent U.S. Appl. No. 10/837,443 and is not being resubmitted herewith per 37 CFR 1.98(d).).

"Efficient Management of Multiversion Documents by Object Referencing", Proceedings of the 27th VLDB Conference, 2001, pp. 291-300.(The corresponding document was previously submitted in connection with parent U.S. Appl. No. 10/837,443 and is not being resubmitted herewith per 37 CFR 1.98(d).).

Zdonik S., "Object Management System Concepts", ACM, 1984, pp. 13-19. (The corresponding document was previously submitted in connection with parent U.S. Appl. No. 10/837,443 and is not being resubmitted herewith per 37 CFR 1.98(d).).

Han, et al., WebSplitter: A Unified XML Framework for Multi-Device Collaborative Web Browsing, 2000, ACM Conference on Computer Supported Cooperative Work, pp. 10. (The corresponding document was previously submitted in connection with parent U.S. Appl. No. 10/837,443 and is not being resubmitted herewith per 37 CFR 1.98(d).).

IBM:Stack Algorithm for Extractin Subtree from Serialized Tree, Mar. 1, 1994, TDB-ACC-NONN94033, pp. 3. (The corresponding document was previously submitted in connection with parent U.S. Appl. No. 10/837,443 and is not being resubmitted herewith per 37 CFR 1.98(d).).

Altova, Inc., "XML Spy 4.0 Manual, "Altova Inc. & Altova GmbH, coyright 1998-2001, Chapters 1, 2 and 6, encompassing pp. 1-17, 18-90 and 343-362. (The corresponding document was previously submitted in connection with parent U.S. Appl. No. 10/837,443 and is not being resubmitted herewith per 37 CFR 1.98(d).).

Cybook, Inc., "Copying the Search Form to Services-based Web Sites", Internet Article, (online) Jul. 26, 2004, "the whole document". (The corresponding document was previously submitted in connection with parent U.S. Appl. No. 10/837,443 and is not being resubmitted herewith per 37 CFR 1.98(d).).

Excel Developer Tip (hereinafter "Excel"), "Determining the Data Type of a Cell", May 13, 1998, p. 1 (available at http://jwalk.com/ss//excel/tips/tip62.htm). (The corresponding document was previously submitted in connection with parent U.S. Appl. No. 10/837,443 and is not being resubmitted herewith per 37 CFR 1.98(d).).

Macromedia, Inc., "Dreamweaver Technote,Changes in copying and pasting in Dreamweaver 4", Internet Article (online), "the whole document". (The corresponding document was previously submitted in connection with parent U.S. Appl. No. 10/837,443 and is not being resubmitted herewith per 37 CFR 1.98(d).).

Rado, Dave, "How to create a template that makes it easy for users to "till in the blanks", without doing any Programming", Microsoft Word MVP FAQ Site, (online), Apr. 30, 2004, the whole document. (The corresponding document was previously submitted in connection with parent U.S. Appl. No. 10/837,443 and is not being resubmitted herewith per 37 CFR 1.98(d).).

Cover, XML Forms Architecture, retrieved at <<http://xml.coverpages.org/xfa.html>>, on Aug. 17, 2006, Cover Pages, Jun. 16, 1999. (The corresponding document was previously submitted in connection with parent U.S. Appl. No. 10/837,443 and is not being resubmitted herewith per 37 CFR 1.98(d).).

Raggett, "HTML Tables", retrieved on Aug. 6, 2006, at <<http:www://is-edu.hcmuns,edu.vn/WebLib/books/web/Tel/html3-tables.html>>, W3C Internet Draft, Jul. 7, 1995, pp. 1-12. (The corresponding document was previously submitted in connection with parent U.S. Appl. No. 10/837,443 and is not being resubmitted herewith per 37 CFR 1.98(d).).

"Webopedla Computer Dictionary", retrieved on May 9, 2006, at <<http://www.pewebopedia.com/TERM/O/OLE. html>>, Jupiter media Corporation, 2006, pp. 7. (The corresponding document was previously submitted in connection with parent U.S. Appl. No. 10/837,443 and is not being resubmitted herewith per 37 CFR 1.98(d).).

Microsoft Corporation, "Microsoft Computer Dictionary" Microsoft Press, Fifth Edition, p. 149. (The corresponding document was previously submitted in connection with parent U.S. Appl. No. 10/837,443 and is not being resubmitted herewith per 37 CFR 1.98(d).).

"XForm 1.0", W3C, Jul. 16, 2001. (The corresponding document was previously submitted in connection with parent U.S. Appl. No. 10/837,443 and is not being resubmitted herewith per 37 CFR 1.98(d).).

Andrew Watt, Microsoft Office Infopath 2003 Kick Start, Mar. 23, 2004 (Published by Sams), Print ISBN-10: 0-672-32623-X, pp. 1-57. (The corresponding document was previously submitted in connection with parent U.S. Appl. No. 10/837,443 and is not being resubmitted herewith per 37 CFR 1.98(d).).

Grosso, et al., XML Fragment Interchange, Feb. 2001, W3C, pp. 1-28. (The corresponding document was previously submitted in connection with parent U.S. Appl. No. 10/837,443 and is not being resubmitted herewith per 37 CFR 1.98(d).).

Dubinko, XForms Essentials, 2003, O'Reilly, pp. 1-208. (The corresponding document was previously submitted in connection with parent U.S. Appl. No. 10/837,443 and is not being resubmitted herewith per 37 CFR 1.98(d).).

Raman, et al., XForms 1.0, Dec. 2001, W3C, 1.0, section 1-1.2.2.3 & Appendices A-G. (The corresponding document was previously submitted in connection with parent U.S. Appl. No. 10/837,443 and is not being resubmitted herewith per 37 CFR 1.98(d).).

Singh, Microsoft Infopath 2003 by Example, Apr. 20, 2003, Perfect XML, pp. 1-19. (The corresponding document was previously submitted in connection with parent U.S. Appl. No. 10/837,443 and is not being resubmitted herewith per 37 CFR 1.98(d).).

Beauchemin, et al., Using InfoPath to Create Smart Forms, Mar. 27, 2003, Microsoft, pp. 1-6. (The corresponding document was previously submitted in connection with parent U.S. Appl. No. 10/837,443 and is not being resubmitted herewith per 37 CFR 1.98(d).).

Hoffman, Architecture of Microsoft Office InfoPath 2003, Jun. 2003, Microsoft, pp. 1-18. (The corresponding document was previously submitted in connection with parent U.S. Appl. No. 10/837,443 and is not being resubmitted herewith per 37 CFR 1.98(d).).

InfoPath and Xforms, Feb. 26, 2003, InfoWorld, pp. 1-3. (The corresponding document was previously submitted in connection with parent U.S. Appl. No. 10/837,443 and is not being resubmitted herewith per 37 CFR 1.98(d).).

Dubinko, Xforms and Microsoft InfoPath, Oct. 29, 2003, "XML.com", pp. 1-6. (The corresponding document was previously submitted in connection with parent U.S. Appl. No. 10/837,443 and is not being resubmitted herewith per 37 CFR 1.98(d).).

Catorcini, et al., Support and Troubleshooting for XML Schema in InfoPath 2003, Aug. 2004, pp. 1-18. (The corresponding document was previously submitted in connection with parent U.S. Appl. No. 10/837,443 and is not being resubmitted herewith per 37 CFR 1.98(d).).

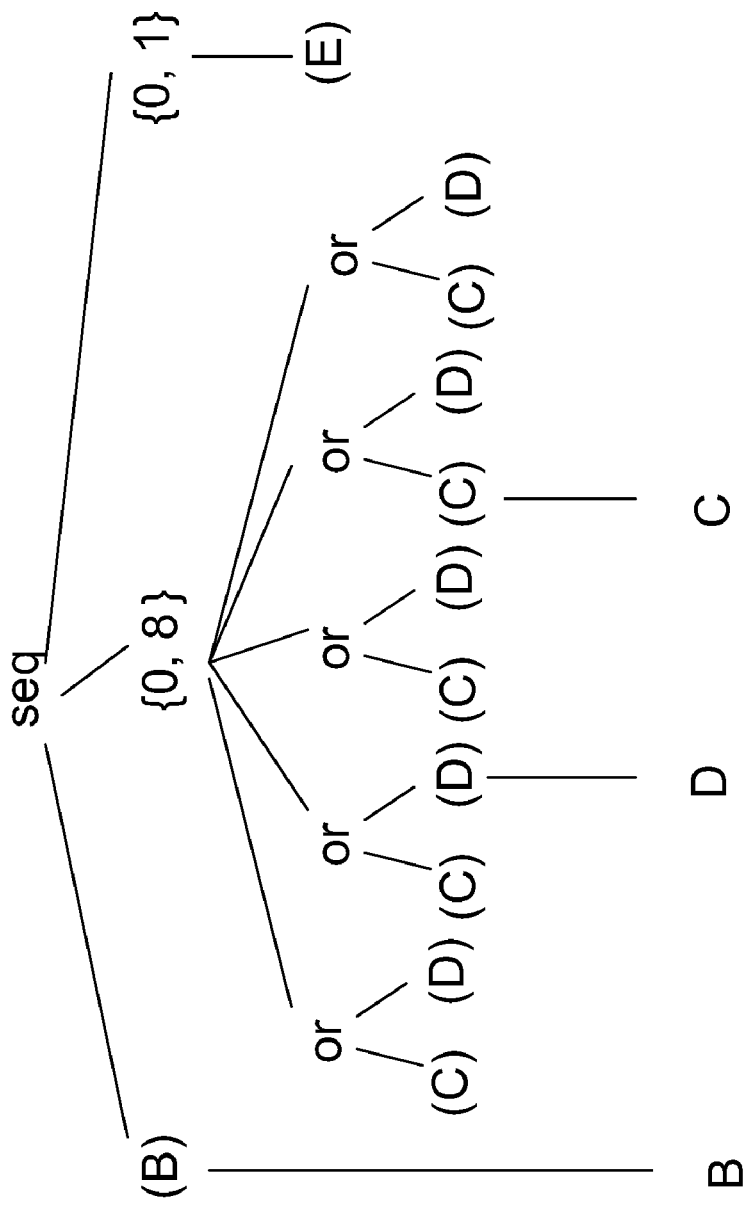

A ::= B? (C D?)+

ICM for <B/><C/><C/>:

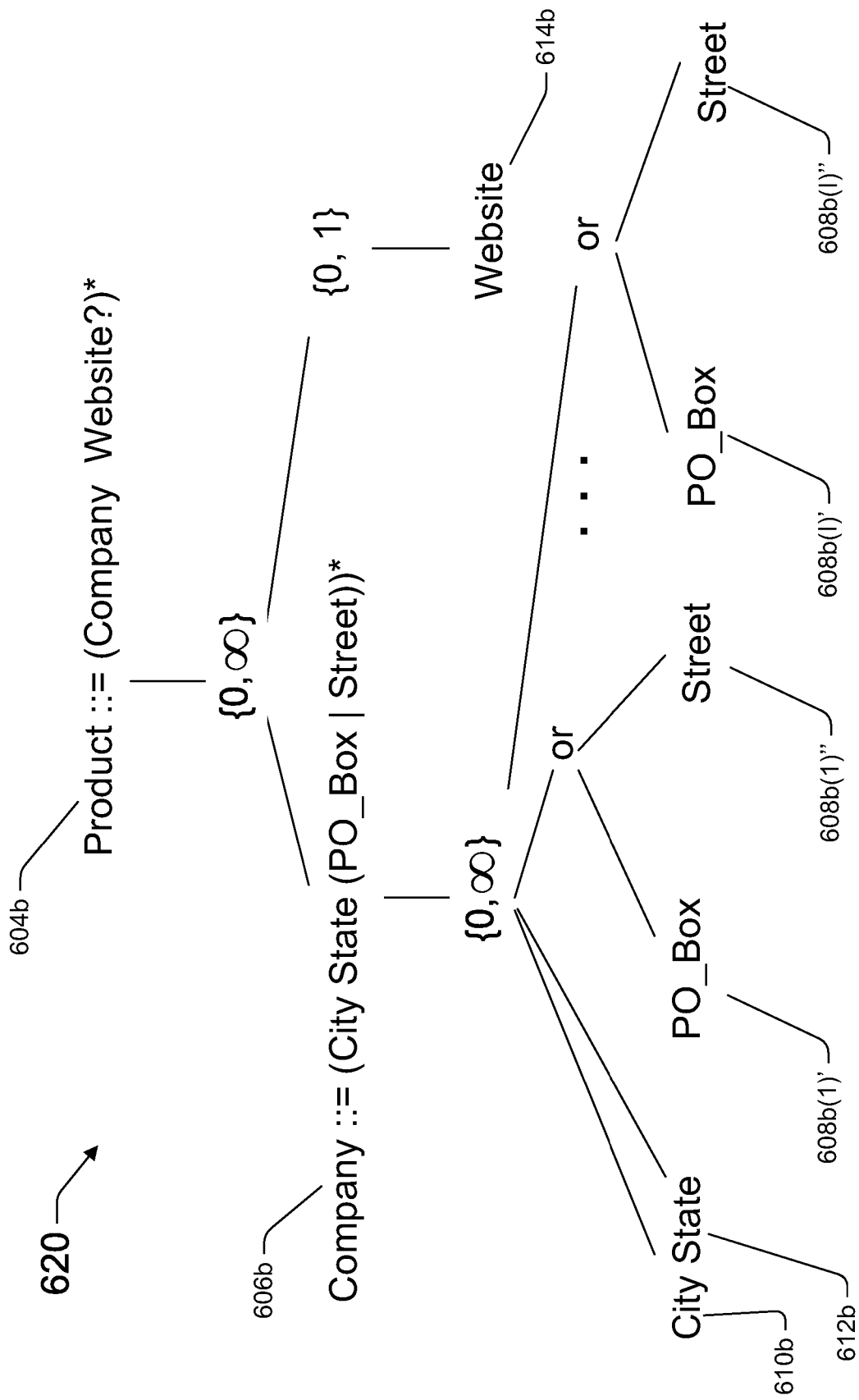

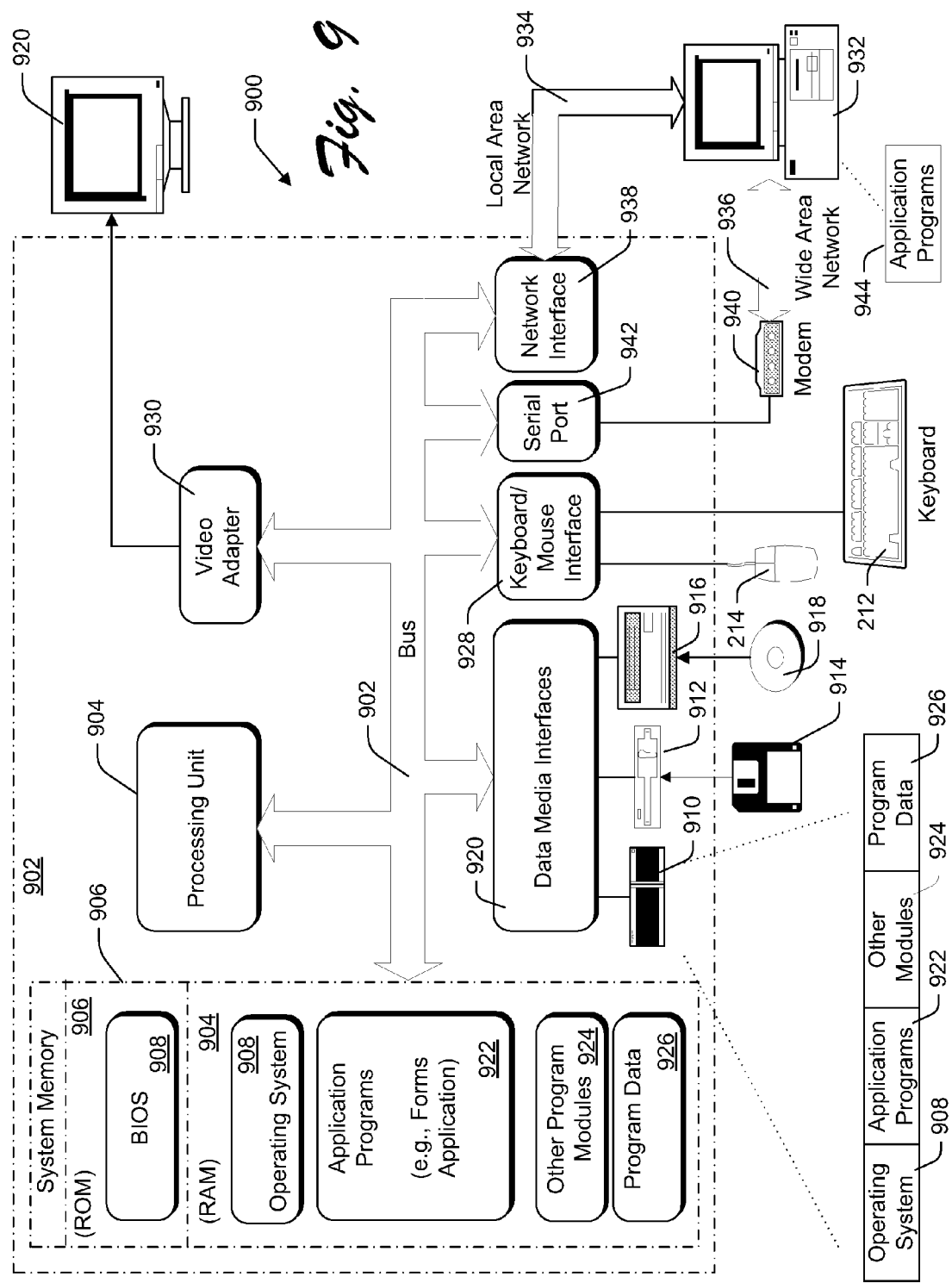

US 8,046,683 B2

STRUCTURAL EDITING WITH SCHEMA AWARENESS

CROSS-REFERENCES TO RELATED APPLICATIONS

This application is co-pending and claims priority to U.S. application Ser. No. 10/837,443, titled "Structural Editing With Schema Awareness" and filed Apr. 29, 2004.

TECHNICAL FIELD

This invention relates to the editing of structured data in a manner that provides mapping between the structured data and a visual presentation in which the structured data is interactively edited, and is more particularly related to efficiently identifying a hierarchy in the structured data, and its location, in order to support interactive data insertion or deletion.

BACKGROUND

FIG. 1 shows an environment in which a data processing application 100 is executed so as to edit a structured document by processing documents containing structured data 102. The data processing application 100 is exemplary and can generally be described as processing structured data 102 expressed in a markup language so as to transform the structured data 102 using a solution module 104 to produce transformed information. During the process, the structured data can be presented as a rendering of a visual surface 106 (also referred to here in as a document view 106) on an output device. An editing user 108 interacts with the visual surface 106, as indicated by arrow 110, using, for instance keyboard 112, mouse device 114, or some other input device. The visual surface 106 can constitute the presentation of an electronic form having data entry fields associated with the structured data 102. In this case, the editing user 108's interaction 110 can involve the editing user 108 filling information into existing data entry fields of the electronic form, inserting and filling in new fields (as in table rows) or deleting or substituting regions of the editing surface that represent data subtrees.

The structured data 102 is a markup language. By way of example, and not by way of limitation, the markup language can be represented in Extensible Markup Language (XML). Accordingly, the structured data 102 is hereinafter referred to as an XML document 102. XML, which is documented as a W3C Standard set forth in Paoli et al., 1998, W3C recommendation, enables developers to create customized tags that describe the meaning of data, as opposed to the presentation of data.

The environment in which the data processing application 100 operates includes an Extensible Stylesheet Language Transformations (XSLT) processor that translates an XML document 102 into the visual surface 106 The visual surface 106 can also comprise another XML document, or a document expressed in a presentation-oriented markup language, such as Hypertext Markup Language (HTML). XML provides tags that represent the data contained in a document. In contrast, presentation-oriented languages, such as Hypertext Markup Language (HTML), provide tags that convey the visual appearance of a document. Accordingly, these technologies complement each other; XML allows information to be efficiently transferred and processed, while HTML allows information to be presented for display.

XSLT itself uses an XML syntax. The XSLT processor performs its translation function by making reference to one or more XSLT stylesheets. The XSLT stylesheets contain a collection of rules for mapping elements in the XML document 102 to the visual surface 106 or document view 106. To perform this function, XSLT defines its operands through XPath. XPath is a general-purpose query language for addressing and filtering the elements and text of XML documents. XPath expressions can address parts of an XML document, and can manipulate strings, numbers, and booleans, etc. In the context of the XSLT processor, XPath expressions can be used to select a portion of the XML document 102 that matches a prescribed match pattern, and then perform some translation operation on that portion using a rule provided in the XSLT stylesheets. XML, XSLT, and XPath are described at length in their governing specifications provided by the World Wide Web Consortium (W3C).

The XML document 102 is composed of XML elements, each of which includes a start tag (such as <author>), an end tag (such as </author>), and information between the two tags (which is referred to as the content of the element). An element may include name-value pairs (referred to as attributes) related by an equal sign (such as MONTH="May"). The elements in the XML document 102 have a hierarchical relationship to each other that can be represented as a data tree 116. The elements in the data tree 116 are also commonly referred to as "nodes." All elements are nodes, but the converse is not true. As used herein, attributes, attribute values, and text content are all nodes. A so-called XML schema (not illustrated in FIG. 1) is a particular XML language that provides a syntactic description of an XML structure. If an XML structure is an instance of the schema that it refers, it is said to be valid according to that schema.

The solution module 104 includes a data-mapping module 118. The purpose of the data-mapping module 118 is to map the structured data 102 to the visual surface/document view 106. The data-mapping module 118 can perform this task using so-called stylesheets, such as stylesheets written using XSLT. XSLT maps the structured data 102 to a format appropriate for presentation, such as HTML, Extensible Hypertext Markup Language (XHTML), etc. In other words, documents expressed in XML include tags that are particularly tailored to convey the meaning of the data in the documents. The XSLT conversion converts the XML documents into another markup language in which the tags pertain to the visual presentation of the information contained in the documents. (To facilitate discussion, the following description assumes the use of HTML to render the documents; however, other presentation-oriented markup languages can be used to render the documents.) Because HTML is a markup language, it can be conceptualized as a view tree 120 that includes a hierarchical organization of nodes, as in the case of data tree 116. The reader is referred to the World Wide Web Consortium's specifications for background information regarding XML and XSLT. Arrow 126 represents mapping of information in the data tree 116 to information in the view tree 120.

A view-mapping module 122 enables nodes in the view tree 120 to be mapped to corresponding nodes in the data tree 116. The mapping of nodes in the view tree 120 to nodes in the data tree 116 allows the solution module 104 to correlate editing operations performed on the visual surface/document view 106 with corresponding nodes in the underling structured data 102. This allows the solution module 104 to store information entered by the editing user 108 at appropriate locations within the structured data 102 during an editing session. Arrow 124 represents the mapping of information in the view tree 120 back to associated information in the data tree 116.

By way of broad overview, the mapping module 122 provides mapping between the visual surface/document view 106 and the XML document 102 by adding annotations to the view tree 120 used to render the visual surface/document view 106. These annotations serve as references which point back to specific locations in the data tree 116. FIG. 1 represents the annotation of the visual surface/document view 106 by showing an annotated HTML document 128 being output from the solution module 104.

The visual surface/document view 106 itself has an appearance that is determined by both the information contained in the XML document 102 as well as the effects of the XSLT transformation provided by the mapping module 118. Generally, in the case of electronic forms, the visual surface/document view 106 typically includes a hierarchical structure which is related to the hierarchical structure in the XML document 102. For instance, an exemplary electronic form 130 includes multiple sections pertaining to different topics that reflect the topics in the XML document 102. (However, it is not necessary to have a one-to-one direct correspondence between the organization of the XML document 102 and the organization of the visual surface/document view 106; in other words, the transformation of the XML document 102 to the visual surface/document view 106 is generally considered non-isomorphic). Each section in the exemplary electronic form 130 can include one or more data entry fields for received input from the editing user 108, such as data entry field 132. The data entry fields are also referred to herein as "editing controls." Different graphical components can be used to implement the editing controls, including text boxes, drop-down list boxes, list boxes, option buttons (also referred to as radio buttons), check boxes, and so on. FIG. 6, to be described, provides an example of the visual appearance of an electronic form as it is being used by an editing user to enter and/or edit data via the data entry fields thereon.

Path 134 generally represents the routing of information entered via the electronic form 130 back to the XML document 102. In other words, the data entry fields in the electronic form 130 (such as data entry field 132) are associated with respective nodes in the data tree 116. Entry of information via electronic form 130 will therefore prompt the solution module 104 to route such information to appropriate storage locations in the data tree 116. Again, the linking between the electronic form 130 and the XML document 102 is provided by the mapping module 122.

The functionality provided by the solution module 104 is defined, in part, by a solution file, such as exemplary solution file 136 stored in storage 138. The solution file 136 essentially constitutes an electronic form template, providing all of the semantic information required to transform the XML document 102 into the visual surface/document view 106. Different XML documents may have been created by, or otherwise refer to, different electronic form templates. Accordingly, different XML documents may have different solution files associated therewith. Various techniques can be used to retrieve a solution file that is associated with a particular XML document. For instance, an appropriate solution file can be retrieved based on URN (Uniform Resource Name) or URL (Uniform Resource Locator) information contained in the header of an input XML document. That header information links the input document to a corresponding solution file. A storage 140 represents an archive for storing one or more XML documents created by, or otherwise associated with, respective solution files.

The data processing application 100 supports editing structures such as repeating sections and optional sections that are editing controls bound to XML data. When data is entered or deleted using one of these editing controls, the underlying XML data is correspondingly inserted or deleted. It is non-trivial to identify which hierarchy of XML nodes needs to be deleted or inserted and where they need to be inserted or deleted. Moreover, it is cumbersome to provide exhaustive information in a storage space (e.g., the solution file 136) so that that information can be used to resolve which hierarchy of XML nodes needs to be deleted or inserted, as well as where the hierarchy of XML nodes is to be inserted or deleted. In order to do so, the information being stored must contain a representation of all of the possible fragments for the hierarchy of XML nodes that can be inserted or deleted. Depending upon the complexity of the XML in document 102, the fragment representation can cause the information being stored to be quite large. A large collection of such information can result in a correspondingly large performance problem when loading that information into the data processing application 100.

Seen from another perspective, suppose the XML document 102 includes XML nodes in a structure seen in Table A:

TABLE A

```
A
    B?
        C?
            D?
                E?
                    F
                    G
                    H
``` where the above notation "?" indicates an optional node, and where E is a container for F, G, and H as follows:

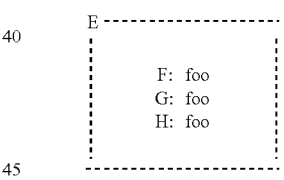

Suppose an optional section bound to the XML node E is to be inserted. In this case, depending on the presence of zero or more of the optional nodes B, C and D, the XML to insert could be one of the following four (4) fragments:

One fragment rooted in E with parent D

One fragment rooted in D with parent C

One fragment rooted in C with parent B

One fragment rooted in B with parent A

In general, as many separate XML fragments would be generated as the number of optional XML nodes that occur on the branch connecting the container node to the item XML node. Stated otherwise, a fragment will be generated from a corresponding item to a corresponding view side container, which may or may not be the same as the data side container, where the data side container is the XML node's parent in a corresponding XML tree. Generating all possible XML fragments, however, can be verbose if the corresponding schema for the XML document is large and/or has a high branching factor.

This verbosity is due to the inability to factor the commonalities among the XML fragments and the need for a separate element for each entry. Again, the impact of this verbosity is that the performance of the user experience in editing an electronic form is poor in the presence of anisomorphic electronic form views on complex schemas for the underlying XML document 102.

It would be an advantage in the art to remove the need to express all of the possible portions of a hierarchical markup language fragment that can be inserted or deleted when editing a structured document by processing documents containing structured data (e.g., data whose structured is described by a schema) that is expressed using the markup language. This reduced expression would in turn advantageously reduce the size of the semantic information required to transform the structured data into the rendered structured document, which would in turn advantageously improve the performance of the rendering.

SUMMARY

According to one exemplary implementation, a method is described for reusing markup language fragment information that would otherwise be spread across different markup language fragments, where fragment redundancy is removed from the markup language fragment information. The method accesses schema information for a markup language document corresponding to an electronic form when the form is being used for data entry. As data is entered into and deleted from the electronic form, the markup language fragment information is used to identify markup language fragments that are correspondingly to be inserted, and view-to-data mapping as well as schema knowledge is involved in identifying nodes to be deleted. The markup language fragment information includes both the largest and the smallest markup language fragments for an insertion or substitution to be performed on an editing control of the electronic form, such as a table or an optional section. The markup language fragment information is used in conjunction with the schema information to ensure that the data entry for the electronic form will be valid. In the case of an insertion, schema information is used to take into account the possible presence or absence of optional ancestors so as to compute a valid insertion position and correctly compute the fragment to insert from the markup language fragment information. In the case of an insertion, deletion, or substitution, edit-time awareness of the schema information is used to take into account the atomic character of optional and repeated sequences of elements so as to avoid disrupting these sequences.

Related computer readable media are also described herein.

BRIEF DESCRIPTION OF THE DRAWINGS

FIG. 7a depicts an Instantiated Content Model (ICM) for the input data <B/><D/><C/> and the content model B (CID)* E?

FIG. 7c depicts a set of content models with an exemplary notation for expressing possible fragments for editing controls corresponding to data entry fields in the UI of FIG. 6.

FIG. 9 shows an exemplary computing environment for implementing the data processing application shown in FIG. 1.

Figure 1:
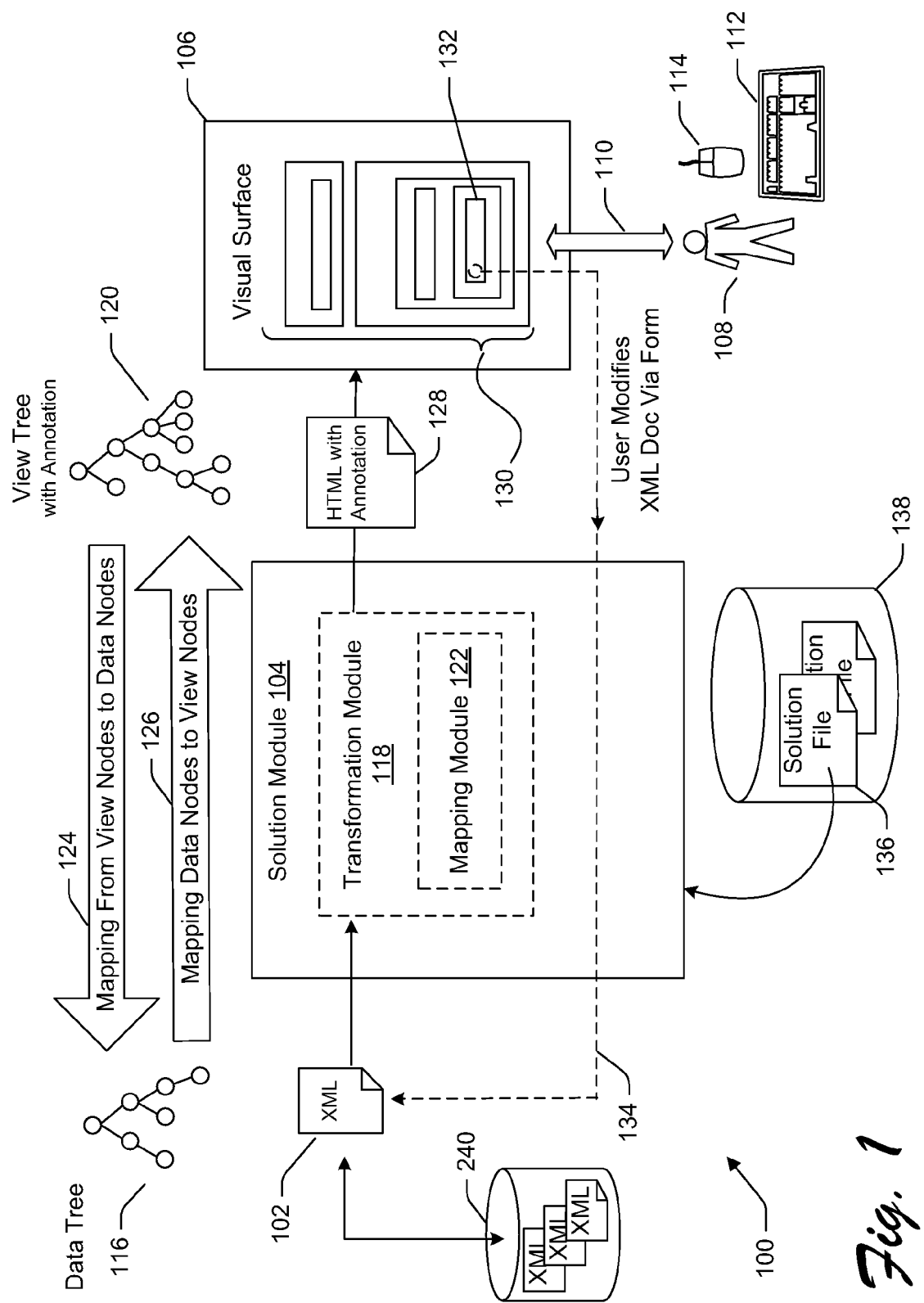
FIG. 1 shows an exemplary data processing application that includes mapping between structured data and a visual surface.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to the rendering and editing of information based on structured input data. To provide a concrete framework for discussion, this disclosure will specifically describe the transformation of hierarchically organized data expressed in a markup language into an electronic form. The electronic form can be visually rendered and edited by an end user. An electronic forms application can be provided with all of the possible portions of the hierarchically organized data that can be inserted or deleted when visually rendering the electronic form. For efficiency sake, these possible portions are expressed using a coding that is reduces the size of the expression. An exemplary electronic form discussed herein is a product catalog, although other exemplary electronic forms are also applicable, including a timesheet, a work order, a travel log, and so on. Moreover, the concepts described herein also have application to other data processing applications besides electronic forms processing.

This disclosure is organized as follows. Section A of this disclosure describes an exemplary design strategy used to provide mapping between structured data and a visual surface. Section B describes an exemplary implementation of the design strategy discussed in Section A. Section C describes an exemplary method of operation of the implementation described in Section B. And Section D describes an exemplary computing environment that can be used to provide the implementation described in Section B.

A. Exemplary Design Strategy

Overview of Design Strategy

Because hierarchically organized data that is expressed in a markup language can be transformed into an electronic form, such electronic forms are based on marked up data, for instance XML data. When modifying the electronic forms using editing controls (e.g., filling out the form or entering data into the form), the editing user is indirectly manipulating the underlying XML tree that will be persisted when the electronic form is saved. For instance, data entry that can be made into the electronic form can be repeating sections and optional sections, each of which is an editing control that is bound to XML data. When data is entered or deleted using an editing control on the electronic form, the underlying XML data is correspondingly inserted or deleted advantageously by providing the editing process an awareness with respect to the schema for the underlying XML data. This schema awareness makes it possible to identify all the XML nodes of a sequence to delete, insert, or substitute, given one of these XML nodes. The XML tree is also validated against a corresponding XSD schema whenever it is being modified. When an editing control on an electronic form is used to enter or to delete data in data entry fields, such as on the visual surface 106 seen in FIG. 1, it may be necessary to insert different fragments of XML depending on what XML nodes are already present in the XML tree.

For example, a fragment for inserting an address in a contact manager database is represented in the XML as:

<address><state></state><zipcode></zipcode></address>.

The schema for the contact manager database specifies that an <address> node can only be a child of a <contact> node. The schema also specifies that the <contact> node can only be a child of the <contacts> node. In this case, when the fragment is inserted, a different subtree may have to be inserted depending on whether there are already <contacts> or <contact> nodes in the XML tree. Here, a first fragment would be used when the <contact> node is already in the XML tree. A different second fragment would be used when the <contacts> node is already in the XML tree, but where there is no <contact> node. A still further different fragment would be used when the <contacts> node is not in the XML tree. In summary, when one of the fragments is inserted or deleted for the address in the contacts manager database, the underlying XML data is correspondingly inserted or deleted with one of the three (3) foregoing fragments, respectively:

---

Fragment#1: <address><state></state><zipcode></zipcode></address>;
Fragment#2:<contact><address>state></state><zipcode></zipcode>
</address><contact>; and
Fragment#3:<contacts><contact><address><state></state><zipcode>
</zipcode></address></contact></contacts>.

---

Note, however, that in the delete case, the parent contact or contacts node would not be deleted.

From the above example for the address field insertion or deletion, a total of 216 characters are needed to express all possible fragments. Stated otherwise, all of the above three (3) fragments are provided at the time that the form is created (e.g., at the time when the electronic form is designed). When the editing user enters data into the electronic form (i.e., at runtime or electronic form 'edit time'), one of the three fragments is chosen to be inserted (depending on which nodes were currently present in the XML tree). As the electronic form is created to include many form editing controls, however, the number of characters needed to express all of the possible fragments for all of the editing controls becomes unmanageably large. The proliferation of fragments, however, is not just dependent on the number of controls in the form. In a complex XML tree, a single control can produce a large amount of redundant fragment data. An unmanageably large number of characters in turn results in a user experience that is frustrating to the editing user who will be plagued with excessive response latency when interacting with a user interface to fill out the electronic form.

Rather than subjecting the editing user to excessive response latency due to the unmanageably large number of characters in the collection of all possible fragments needed at edit time for an electronic form, implementations provide for an edit time user experience in which an electronic forms application is aware of the underlying schema that corresponds to the electronic form. This awareness makes it possible to provide no more than one (1) fragment for each insertion command in the definition of the electronic form (e.g., an ".XSF" file as discussed below), thereby keeping the number of characters stored in the solution file to the absolute minimum required. When the editing user performs data entry into the electronic form at edit time, code is present at edit time that allows the electronic forms application to determine the particular portion of the 'one (1) maximal information fragment' that needs to be inserted into the XML tree. The term "maximal information fragment", as used here, is intended to denote the list of data subtrees that is maximal both in size and in subtree sizes among potentially insertable fragments. This code requires the edit time to be aware of the underlying schema and uses a data structure named 'Instantiated Content Model (ICM)' to achieve this awareness. In the above example, the ICMs used at edit time would represent the edit-time context into which to insert the Fragment #3 as the 'one (1) maximal information fragment', or a part of this fragment according to the schema constraints encoded into the ICMs. ICMs encode information from a schema (e.g., the solution file 136 seen in FIG. 1) and represent the relations between this schema information, existing data nodes that instantiate schema elements and virtual data nodes that can be inserted to instantiate optional schema elements. As such, ICMs can be used to ensure that an electronic form will transition from one valid state to another valid state as an editing user inserts and deletes data into various edit controls (e.g., data entry fields) in an electronic form during data entry at edit time.

The above example involves three content models. If we omit the content model in which Contacts appears as an optional element. Contacts has the content model "Contact*", and Contact in its turn has the content model "(address state zipcode)*", where "*" indicates that the preceding characters represent zero or more nodes and where the closed parentheses indicate a group of nodes. A standard abstract syntax tree for Contact's content model is as follows.

TABLE B

*
|
sequence
|
Address City Zipcode

An ICM is built by matching such an abstract syntax tree with XML data. For example, matching the abstract syntax tree in Table B with the XML data "<Address>a</Address><City>c</City><Zipcode>z</Zipcode>" will yield the following structure.

TABLE B'

```
*
|---------------------------|-------------------------------------------|---------------------|
sequence                    sequence                                    sequence
|                           |                                           |
Address City ZipCode    Address         City            Zipcode     Addr. Cit. Zip.
                           |             |                 |
                    <Address>a</Address> |         <Zipcode>z</Zipcode>
                                    <City>c</City>
```

The ICM contains nodes instantiated by input nodes and uninstantiated nodes at which insertions are allowed. In addition, the semantics of the "*" node allows the deletion of any instantiated sequence.

Table B' highlights the case where there are repeating nodes. Schema aware editing code, as implemented herein, can also deal with constructs like optional sections, choices and recursion.

Implementations of schema aware editing uses schema knowledge in order to accomplish the Features (i)-(iii) as follows:

Feature (i): identify all the nodes of a sequence to delete, insert, or substitute, given one of these nodes;

Feature (ii): use only the relevant parts of a fragment to insert according to an insertion context; and Feature (iii): based on the current selection or the command activated, find the most intuitive location in the context that allows the operation, which is generally the highest insertable position below the parent.

Feature (i) requires mapping a XML tree node to a representation of its parent's ICM. This makes it possible to determine whether it belongs to a sequence containing other nodes and, in this case, to delete the whole sequence to ensure validity and reflect the semantics of the deletion. Feature (ii) involves inserting a variable geometry fragment by identifying the sub-fragment to insert by searching for the best insertable position below the parent as per Feature (iii) and determining which siblings of this sub-fragment must be inserted to satisfy the schema.

An ICM, alternatively stated, is a tree with XML nodes representing either a regular expression operator (sequence, choice, occurrence, etc) or a XML tree node. XML tree nodes occur only in the leaves of the ICM tree. The ICM tree is constructed based on the schema. Walking the ICM tree determines the position to insert the XML node and identifies the sub-fragment that is to be inserted.

Several examples of a general nature will now be given. A particular XML fragment will be designated to contain the largest possible XML fragment that can be inserted, which is the one that can typically be inserted directly into the corresponding XML node bound to a corresponding container. A new XML attribute in the definition of the electronic form can be defined and is named in the XML examples below as 'innerFragment'. This new XML attribute contains an XPATH relative to the fragment for the XML node that identifies the smallest fragment that can be inserted. Given these two parameters, respectively identified as the largest and smallest XML fragments that can be inserted, it is possible to identify the position of the current context within the largest fragment and to choose the right sub-tree to insert in every occasion.

EXAMPLES

A General Tree

The XML describing the definition for the electronic form will be examined in the following three (3) cases that represent three (3) classes of interaction. For all three (3) classes, the three (3) cases use the following tree:

```
Y
 Z?
  A?
   choice *
    B?
    C
    D*
    E+
   sequence *
    F+
    G?
    H*
   I
``` where the notation "?" means that the preceding XML node is optional, the notation "*" means that the preceding XML node repeats from zero to an infinite number of occurrences, and the notation "+" means that one or more of the preceding XML node will be present.

Case 1: The Container is the Root XML Node

In this case, shown in Table C, there is an optional section bound to the G XML node containing a text field bound to the G XML node as well. There is no explicit containing section (e.g., the container is the root element, <Y>).

TABLE C

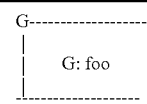

For this case, the XML for the definition of the electronic form that would be generated is as follows:

```
<xsf:xmlToEdit item="/Y/Z/A/G" container="/Y">
  <xsf:editWith component="xOptional" ... >
    <xsf:fragmentToInsert>
      <xsf:chooseFragment parent="." innerFragment="Z/A/G">
        <Z>
          <A>
            <F>foo</F>
            <G>bar</G>
            <I>baz</I>
          </A>
        </Z>
      </xsf:chooseFragment>
    </xsf:fragmentToInsert>
  </xsf:editWith>
</xsf:xmlToEdit>
```

Case 2-the Container is an Ancestor of the Item

In this case, shown in Table D, an optional section bound to the G XML node with a text box bound to the 'G' inside it is located within a section bound to an ancestor of the G XML node (e.g., in this case the parent element, A)

TABLE D

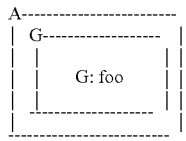

For this case, the XML for the definition of the electronic form that would be generated is as follows:

```
<xsf:xmlToEdit item="/Y/Z/A/G" container="/Y/Z/A">
 <xsf:editWith component="xOptional" ... >
  <xsf:fragmentToInsert>
   <xsf:chooseFragment parent="." innerFragment="G">
    <F>foo</F>
    <G>bar</G>
    <I>baz</I>
   </xsf:chooseFragment>
  </xsf:fragmentToInsert>
 </xsf:editWith>
</xsf:xmlToEdit>
```

Case 3-the Container is a Sibling of the Item

In this case, the optional section bound to the XML node G and containing the textbox bound to the XML node G is located within a section bound to the XML node B, a sibling of the XML node G, as shown in Table E.

TABLE E

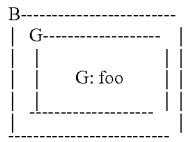

For this case, the XML for the definition of the electronic form that would be generated is as follows:

```
<xsf:xmlToEdit item="/Y/Z/A/G" container="/Y/Z/A/B">
 <xsf:editWith component="xOptional" ... >
  <xsf:fragmentToInsert>
   <xsf:chooseFragment parent="../../.." innerFragment="Z/A/G">
    <Z>
     <A>
      <F>foo</F>
      <G>bar</G>
      <I>baz</I>
     </A>
    </Z>
   </xsf:chooseFragment>
  </xsf:fragmentToInsert>
 </xsf:editWith>
</xsf:xmlToEdit>
```

Figure 2:
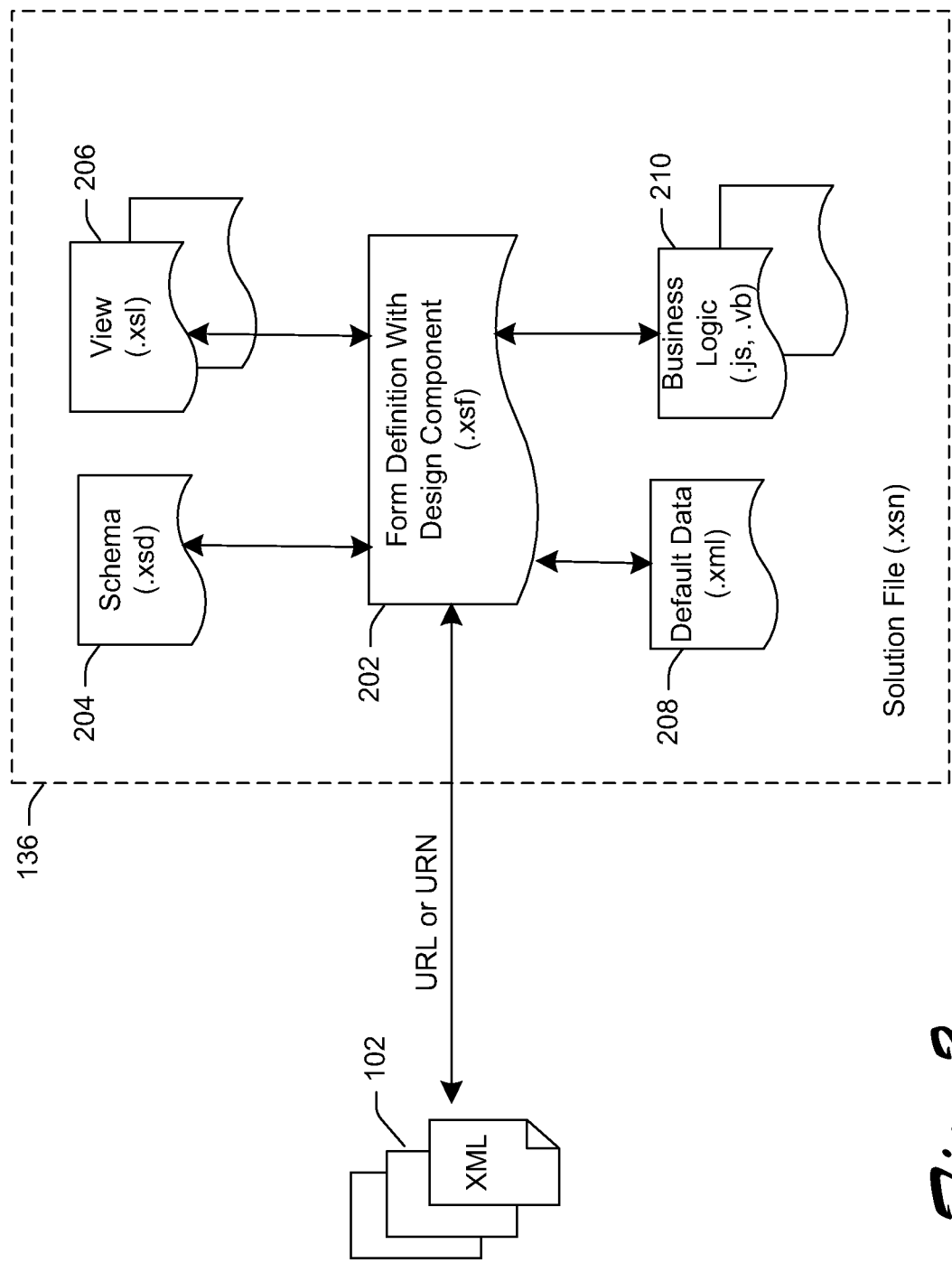
FIG. 2 shows an exemplary solution file used in conjunction with a solution module shown in FIG. 1.

FIG. 2 shows an exemplary composition of the solution file 136. As shown there, the solution file 136 contains a collection of files (202, 204, 206, 208, and 210) that together provide semantic information used, in part, to implement the solution module 104. This collection of files can be packaged together. In one exemplary implementation, this collection of files is referred to using an extension '.xsn'. A form definition file 202, also called a manifest file, forms the centerpiece of the collection. The form definition file 202 contains information about all of the other files in the solution module 104. A design component which is used when an electronic form is being created so as to contain various editing controls, including text boxes, drop-down list boxes, list boxes, option buttons (also referred to as radio buttons), check boxes, and so on. Some of these controls may be included in the forms definition file 202. This file 202 is assigned the exemplary extension '.xsf'. Three examples of XML code for the forms definition file 202 are given above with respect to Tables C-E and their corresponding Cases 1-3.

A schema file 204 is used to constrain and validate the XML document 102. This file is assigned the exemplary extension '.xsd'. View files 206 are used to transform the XML document 102, for presentation as views (visual surfaces 106). These files are used to implement the mapping module 118 discussed in connection with FIG. 1. There can be multiple view files 206 corresponding to multiple possible views (i.e., visual surfaces 106) that the editing user 108 can select from. The view files 206 are assigned the exemplary extension '.xsl'. A default data file 208 contains default data that can be initially displayed in the view when an editor user 108 first opens the electronic form, and has not yet begun to edit the fields. This file 208 is assigned the exemplary extension .xml. Finally, business logic files 210 provide programming code used to implement specific editing behavior, data validation, event handlers, control of data flow, and other features. Such programs can be written in any kind of language, such as the JScript® or VBSCRIPT scripting languages. In this case, these files are assigned the exemplary extensions '.js' or '.vb' (for JScript® and VBSCRIPT scripting languages, respectively).

Exemplary Architecture Solution Module

Figure 3:
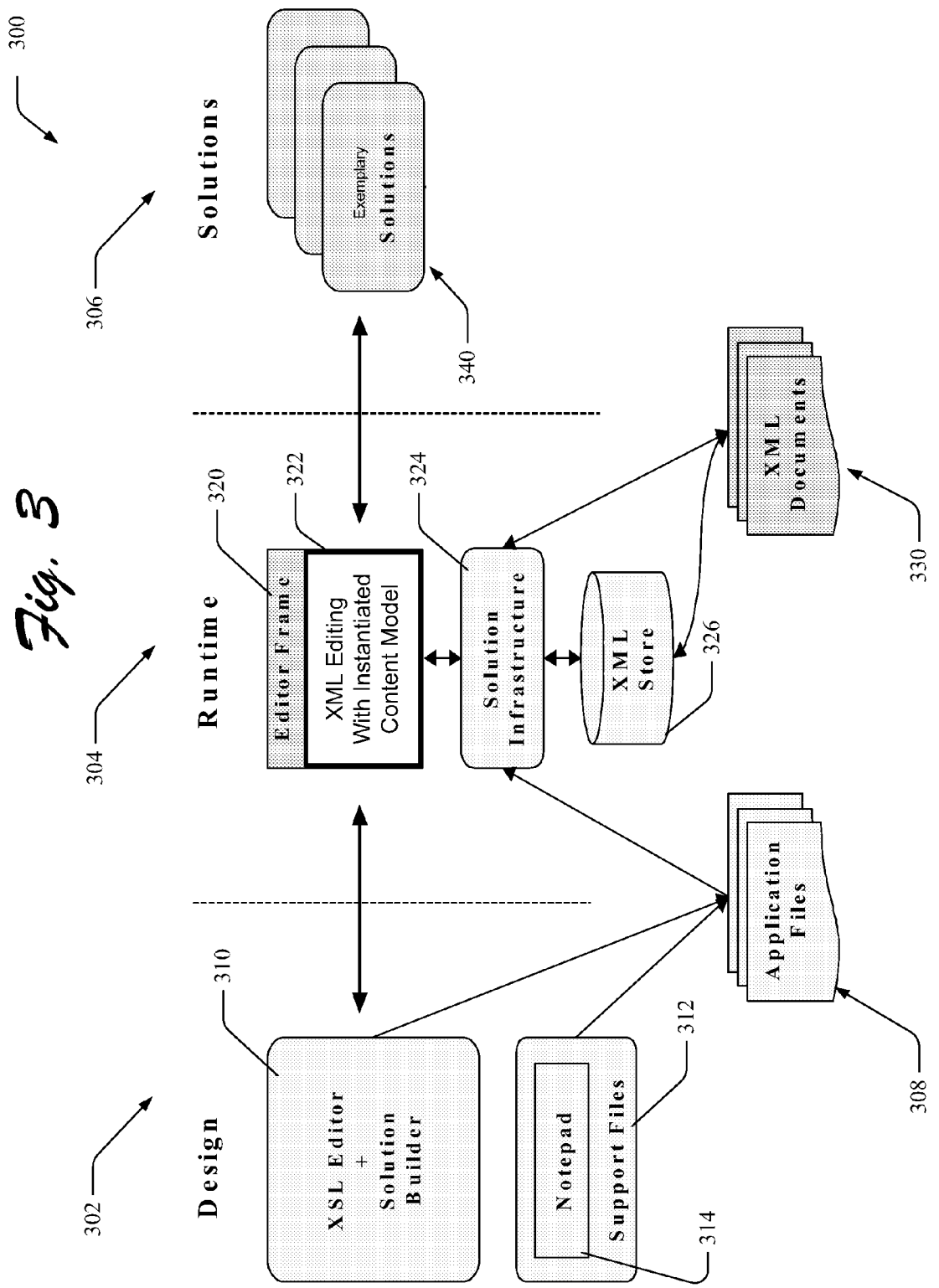
FIG. 3 is a flow diagram illustrating exemplary relationships between design components for an electronic form application, runtime components for using an electronic form designed using the design components, and solution components that are preexisting electronic forms that can be used with the electronic form application.

FIG. 3 shows an exemplary architecture 300 for an electronic forms application that can be used to both create and fill out an electronic form. The architecture 300 includes a solution design component 302 for building a solution corresponding to a data file for which the electronic form can be used, an XML runtime component 304 to enter and view data in the electronic form, and optionally one or more exemplary XML solutions 306. Each of the components of the architecture 300 will now be discussed.

The solution design component 302 of the architecture 300, such as is seen at reference numeral 302 in FIG. 3, allows a solution to be built. The solution design component 302 provides a user interface (UI) to handle all the design requirements for common XML solutions. The result of the solution design component 302 is the set of files that represent a corresponding XML solution file 136. The structure of the XML solution file 136 declaratively defines the output of the solution design component 302. Included in the solution design component 302 are an XSL editor and solution builder 310. Any script editor can be used to edit business logic script used in the electronic form. The supporting files 312 communicate with one or more application files 308 that are useful in building the XML solution file 136 for an XML document 102.

In one implementation, the solution design component 302 provides a WYSIWYG forms designer and editor based on XML standards that can be used for generic XML schemas. As such, XSL editor and solution builder 310 need not be characterized as including an XML editor. Moreover, notepad 314 and support files 312 need not be present.

The runtime component 304 includes an editor frame 320 that includes XML editing 322. The XML editing 322 includes capabilities for an Instantiated Content Model (ICM). The ICM, as previously disclosed, allows for a minimized expression of all of the possible portions of the XML fragments that can be inserted or deleted when the electronic form is being filled out by the editing user 108. This minimized expression in turn reduces the size of the solution infrastructure 324, discussed below, which in turn improves the performance of the rendering of the electronic form. The XML editing 322, in conjunction with the instantiated content model, enables the editing user 108 to validly fill out the electronic form without latency induced by the size of the solution infrastructure 324.

In addition to the foregoing, the editor frame 320 bidirectionally communicates with the solution infrastructure 324, such as XML solution 302 seen in FIG. 3. Each of the solution infrastructure 324 and the XML store 316 bidirectionally communicates with one of more XML documents 330. Additionally, the solution infrastructure 324 communicates with the one or more application files 308. As seen in FIG. 2, the XML document 102 points to the solution file 136 that should process the XML document 102 on a computing device (e.g., a personal computer). When the editing user 18 user uses the computer device to navigate to the XML document 102, the solution infrastructure 324 loads the required the solution file 136. If needed, the solution file 136 handles any contextual user interfaces (UI), runs business logic associated with the XML document 102 (e.g., business logic 210), and enforces security for all operations of the computing device.

The XML solution infrastructure 324 allows the editing user 108 of the computing device to access various XML data sources on the computing device, in an intranet, as well as on an extranet or the World Wide Web. Given the foregoing, XML Documents 330 can be displayed and edited using the XML Editing 322 of the editor frame 320.

Various exemplary solution files 340 can be provided to the editing user 108 of the computing device as part of the architecture 300, where the editing user 108 would like to see sample or exemplary solutions from which the user can learn about the data processing application 100. Exemplary solution files 340 can provide the editing user 108 with a guide for customizing electronic forms and for building new solutions based on the exemplary solutions.

The Mapping Module

Figure 4:
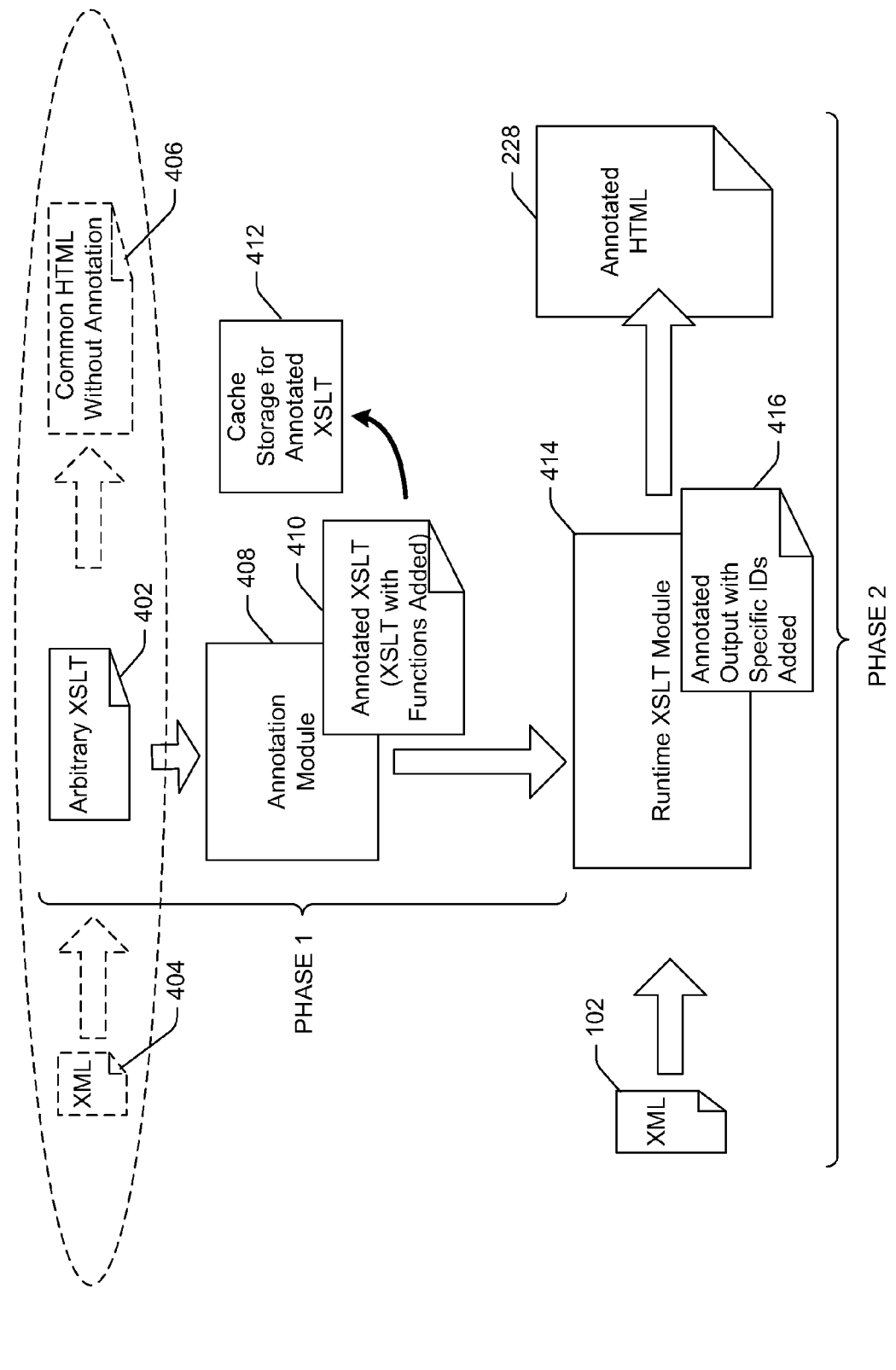
FIG. 4 shows an exemplary mapping module used in the data processing application of FIG. 1.

FIG. 4 shows an exemplary composition of the mapping module 122 introduced in FIG. 1. The mapping module 122 receives the structured data 102 and adds annotations to it to produce the annotated HTML document 128 (or other kind of annotated transformed document). The mapping module 122 performs this task in two Phases: Phase 1 and Phase 2. In Phase 1, the mapping module 122 takes arbitrary XSLT information (or other kind of transformation instructions) and adds mapping functions to it. These mapping functions are inserted at particular locations within the XSLT information. These mapping functions provide functionality that, when activated, generate references to specific locations within the structured XML document 102. However, in the Phase 1 itself, the mapping module 122 simply inserts these mapping functions within the XSLT information; that is, in Phase 1, the mapping module 122 does not execute the functions to return the actual references that point to appropriate parts of the structured XML document 102. In Phase 2, the mapping module 122 executes the mapping functions to provide actual values for the references.

Phase 1 is performed on the XSLT information itself, outside the context of the processing of any specific XML document. More specifically, Phase 1 can be performed once, for instance, after an electronic form has been newly created or modified, or when it has been opened for the first time by the editing user 108. This has the effect of modifying the XSLT information associated with the newly created or modified electronic form by adding mapping functions to it. Phase 2, by contrast, is performed each time a particular structured XML document 102 is rendered. In Phase 2, the mapping functions within the XSLT information are executed with respect to a particular XML document 102, to thereby produce an output HTML document 406 (or other kind of output document) that has references inserted throughout it that point back to various locations in the particular XML document 102. Thus, to summarize, Phase 1 is performed once upon the creation or modification of the XSLT information, whereas Phase 2 is performed each time a particular XML document 102 is rendered. Phase 1 can also be referred to as the "design" phase when a form is created. Phase 2 can also be referred to as the "runtime" phase (i.e., corresponding to runtime 304 seen in FIG. 3) as it is performed when a particular XML document 102 is rendered. Additional aspects of the above-described functionality will be described with reference to the logic illustrated in FIG. 4.

To begin with, Phase 1 acts on so-called arbitrary XSLT information 402. The XSLT information 402 is arbitrary in the sense that it is not prepared specifically with the annotation mechanism described above in mind; in other words, the XSLT information 402 can constitute any kind of XSLT information produced by any process in any environment. The arbitrary XSLT information 402 can serve a conventional role of converting an XML document 404 into an HTML document 406 (or other kind of the document). The resultant HTML document 406 would not contain any back pointer annotations, and hence would not have the capability of mapping a resultant visual surface back to the originating XML document 404.

Phase 1 of the mapping module 122 takes this arbitrary XSLT information 402 and adds mapping functions to it. An annotation module 408 performs this role. The output of the annotation module 408 represents annotated XSLT information 410 having the mapping functions added thereto. The annotated XSLT information 410 can be stored in a storage (for example, a cache storage 412) for later use in Phase 2 (the runtime portion of the procedure).

In one implementation, the mapping functions added by the annotation module 408 can be implemented as so-called XSLT extension functions. More specifically, XSLT provides a collection of tools to accomplish certain tasks. However, the range of functions that can be performed with unsupplemented XSLT is limited; XSLT cannot perform some tasks very well, and cannot perform other tasks at all. Extension functions constitute references within the XSLT information that act as triggers to call some extended functionality to execute tasks not provided within XSLT itself. In the instant case, the extension functions, when executed, perform the task of adding references to the HTML document 128 (or a document expressed in some other structured format) that point back to respective locations in the structured XML document 102. To repeat, however, these mapping functions are not executed in Phase 1; rather, in Phase 1, they are merely inserted in the XSLT information 402 at appropriate locations.

Different strategies can be used to govern where to insert the mapping functions within the XSLT information 402. These strategies may differ from one processing environment to the next, because different processing environments may involve the processing of different types of documents having different characteristics. In the present case, an electronic form often has a nested structure. For instance, a section of the electronic form may contain a subsection, and that subsection may have its own respective subsection(s). Any of these sections and subsections can have data entry fields included therein. For example, an electronic form can include a table that defines a primary section. That table, in turn, can include multiple subsections (e.g., rows), and each row can contain multiple data entry fields. In this context, a so-called outer mapping can be used to identify a certain section or subsection in the electronic form. A so-called inner mapping can be used to specifically identify a data entry field within that section or subsection. The inner mappings thus provide the specific bindings between the data entry fields in the electronic form and the respective nodes of the structured XML document 102 associated with the data entry fields. The outer mappings provide information regarding the scope (e.g., extent) of a section or subsection that may include one or more inner mapping data entry points. In the context of the above example pertaining to the rendering of a table in the electronic form, outer mappings can be used to demarcate the table itself, as well as individual rows within the table. Inner mappings can be used to identify data entry fields within the table.

Still more specifically, the annotation module 408 can add outer mappings in the XSLT information 402 at locations representative of context changes. There are two ways to change context in XSLT: (1) using an "apply-templates" instruction; and (2) using a "for-each" instruction. The "apply-template" instruction causes the output flow of the XSLT processing to move to a new template, which is evaluated in the new context. To mark these context changes, the annotation module 408 annotates all direct children of the template nodes with mapping function calls requesting the respective identifiers (IDs) of the current context. For the "for-each" instruction, the annotation module 408 causes the output flow of the XSLT processing to move to the child of the "for-each" node. In this case, the annotation module 408 annotates all direct children of the "for-each" nodes with mapping function calls requesting the respective IDs of the current context. Generally, as is well known, the "apply-template" instruction applies a template rule deemed most suitable for processing a current node and its children. The "for each" instruction performs specified actions for a collection of nodes that satisfy a selection expression.

The annotation module 408 can add inner mappings in those cases where XSLT pulls the contents of XML nodes of the data tree 116 directly into the view tree 120. This content can be mapped directly from the view tree 120 back to the XML nodes in the data tree 116 from which they were pulled. More specifically, XSLT pulls out content using the "value-of" and "copy-of" instructions used in XSLT. The annotation module 408 marks these content grabs by adding mapping function calls requesting the IDs of the respective XML nodes in the data tree 116 being referenced. Annotations are not generated if the mapping is ambiguous. This could happen if the "value-of" instruction refers to more than one XML node in the data tree 116. Generally, as is well known, the "copy-of" instruction of XSLT copies all aspects (attributes, tags, children, etc.) of identified nodes into a result tree. The "value-of" instruction in XSLT converts the identified nodes to a string and adds this string to the result tree.

The annotation module 408 automatically adds the outer and inner mappings based on the above-described guidelines (that is, by adding mapping functions where the above-described XSLT instructions occur). This automatic annotation may not be sufficient for all situations. To address these cases, XSLT authors can "manually" modify the XSLT to include mapping functions at locations selected by the XSLT authors.

Not only can XSLT authors modify the XSLT to add custom annotations, some software applications, such as an application capable of designing an electronic form, can add these custom annotations in the XSLT.

Phase 2 of the mapping procedure involves executing the mapping functions added in Phase 1 to return specific references to nodes in the data tree 116. A runtime XSLT module 414 performs this function to yield annotated output 416 having specific references added thereto. The ultimate output of the runtime XSLT module 414 is the annotated HTML document 128 (or a document expressed in some other structured format). More specifically, the extension functions added in Phase 1 provide XPath references to namespace functions. When the XSLT information 402 is processed at runtime, the runtime XSLT module 414 reads the namespace functions and calls them, passing a node list as a parameter. The runtime XSLT module 414 analyzes this node list, ensures that it is unambiguous (e.g., that it contains only one node), and returns identifiers for these nodes. The runtime XSLT module 414 writes these identifiers to a result tree, thus building the HTML document 128 having mapping references added thereto.

Additional information with respect to the mapping module 122 in FIG. 1 is disclosed in commonly assigned U.S. patent application Ser. No. 10/723,188, filed on Nov. 26, 2003, entitled "Mapping Interactive Edits Between A Visual Surface And Structured Data", which is incorporated herein by reference in its entirety.

B. Exemplary Apparatus for Implementing Mapping

Figure 5:
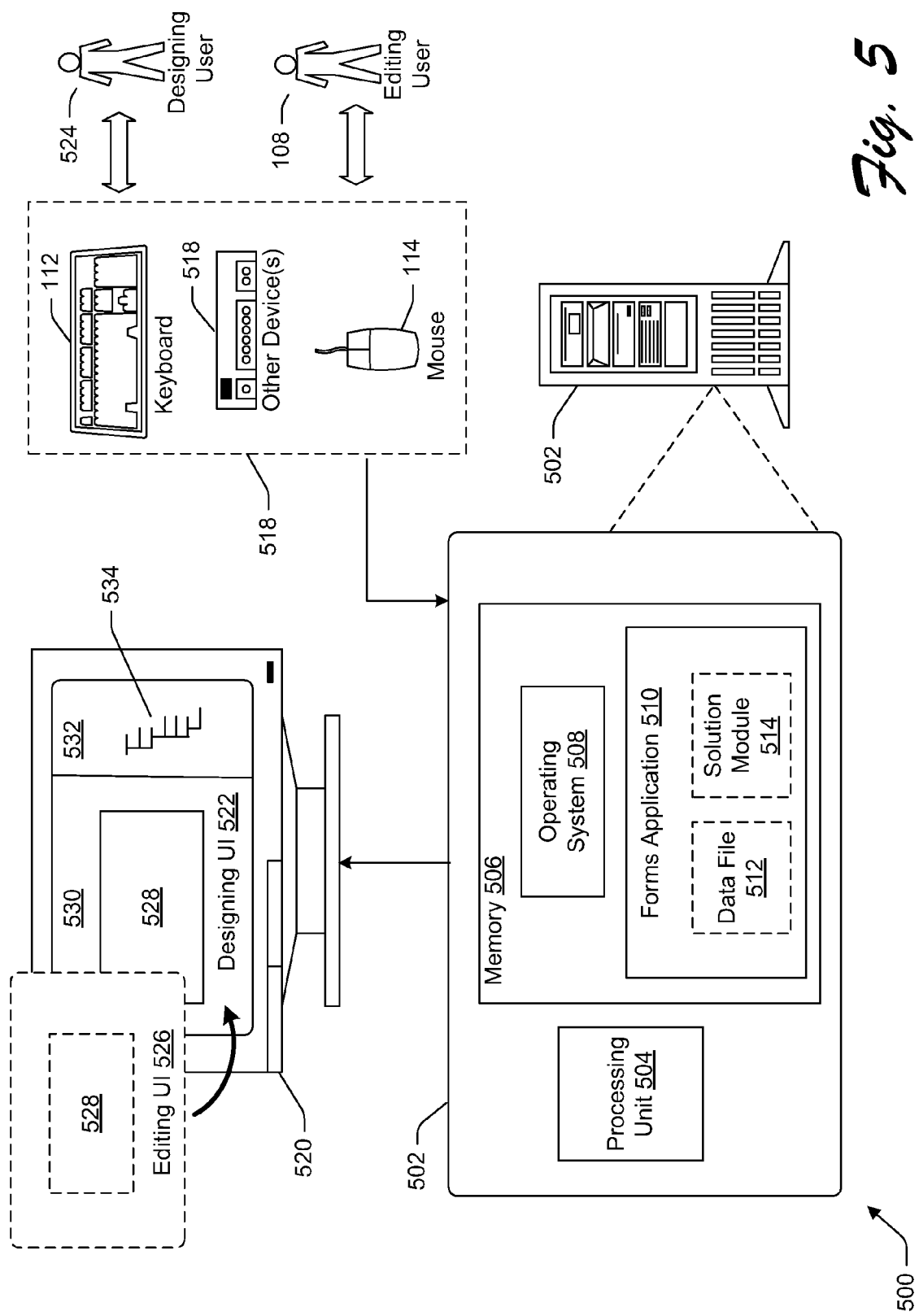
FIG. 5 shows an exemplary apparatus for implementing the data processing application shown in FIG. 1.

FIG. 5 shows an overview of an exemplary apparatus 500 for implementing the data processing application 100 shown in FIG. 1. The apparatus 500 includes a computer 502 that contains one or more processing units 504 and memory 506. Among other information, the memory 506 can store an operating system 508 and the above-described data processing application 100, identified in FIG. 5 as a forms application 510. The forms application 510 can include data files 512 for storing the structured XML document 102, and a solution module 514. The solution module 514 comprises logic that specifies the appearance and behavior of the visual surface 106 as was described in connection with FIG. 1. The logic provided by solution module 514 is, in turn, determined by a solution file (such as a solution file 136 composed of the files shown in FIGS. 1-2). The computer 502 is coupled to a collection of input devices 516, including the keyboard 112, mouse device 114, as well as other input devices 518. The computer 502 is also coupled to a display device 520.

In one exemplary implementation, the forms application 510 includes a design mode and an editing mode. The design mode presents design UI 522 on the display device 520 for interaction with a designing user 524. The editing mode presents editing UI 526 on the display device 520 for interaction with the editing user 108. In the design mode, the forms application 510 creates an electronic form 528, or modifies the structure of the electronic form 528 in a way that affects its basic schema. In other words, the design operation produces the solution file 136 that furnishes the electronic form 528. In the editing mode, the editing user 108 uses the electronic form 528 for its intended purpose that is, by entering information into the electronic form 528 for a business-related purpose or other purpose.

In the design mode, the forms application 510 can be configured to depict the electronic form 528 under development using a split-screen display technique. More specifically, a forms view portion 530 of the design UI 522 is devoted to a depiction of the normal appearance of the electronic form 528. A data source view portion 532 of the visual surface is devoted to displaying a hierarchical tree 534 that conveys the organization of data fields in the electronic form 528.

An exemplary designing UI 522 can allocate the visual surface 206 into the forms view portion 530 and the data source view portion 532. As described above, the forms view portion 530 contains a depiction of the normal appearance of the electronic form 528 in this case, an exemplary form 600 seen in FIG. 6. The electronic form can includes a plurality text box entry fields. The data source view portion 532 includes the hierarchical tree 534 showing the nested layout of the text fields presented in the electronic form.

The forms application 510 provides multiple techniques for creating the electronic form. According to one technique, the electronic form can be created from scratch by building the electronic form from successively selected editing controls. In another technique, the electronic form can be created based on any pre-existing .xsd schema document (e.g., see schema 240 in FIG. 2) loaded into the forms application 510. The .xsd schema is an XML file that defines the structure and content type of the XML files that are associated with it. In another technique, the electronic form can be created based on an XML document. The forms application 510 will then create a schema based on the information in the input XML file. In another technique, the electronic form can be created based on a database schema. In this case, the forms application 510 will extract the schema of the data and convert that record set to an XML representation. Still other techniques can be used to create electronic forms.

Once a form has been created, its design (and associated schema) can be further modified. For example, the forms application 510 allows the designing user 524 to modify existing editing controls used in the electronic form, or add additional editing controls.

Figure 6:
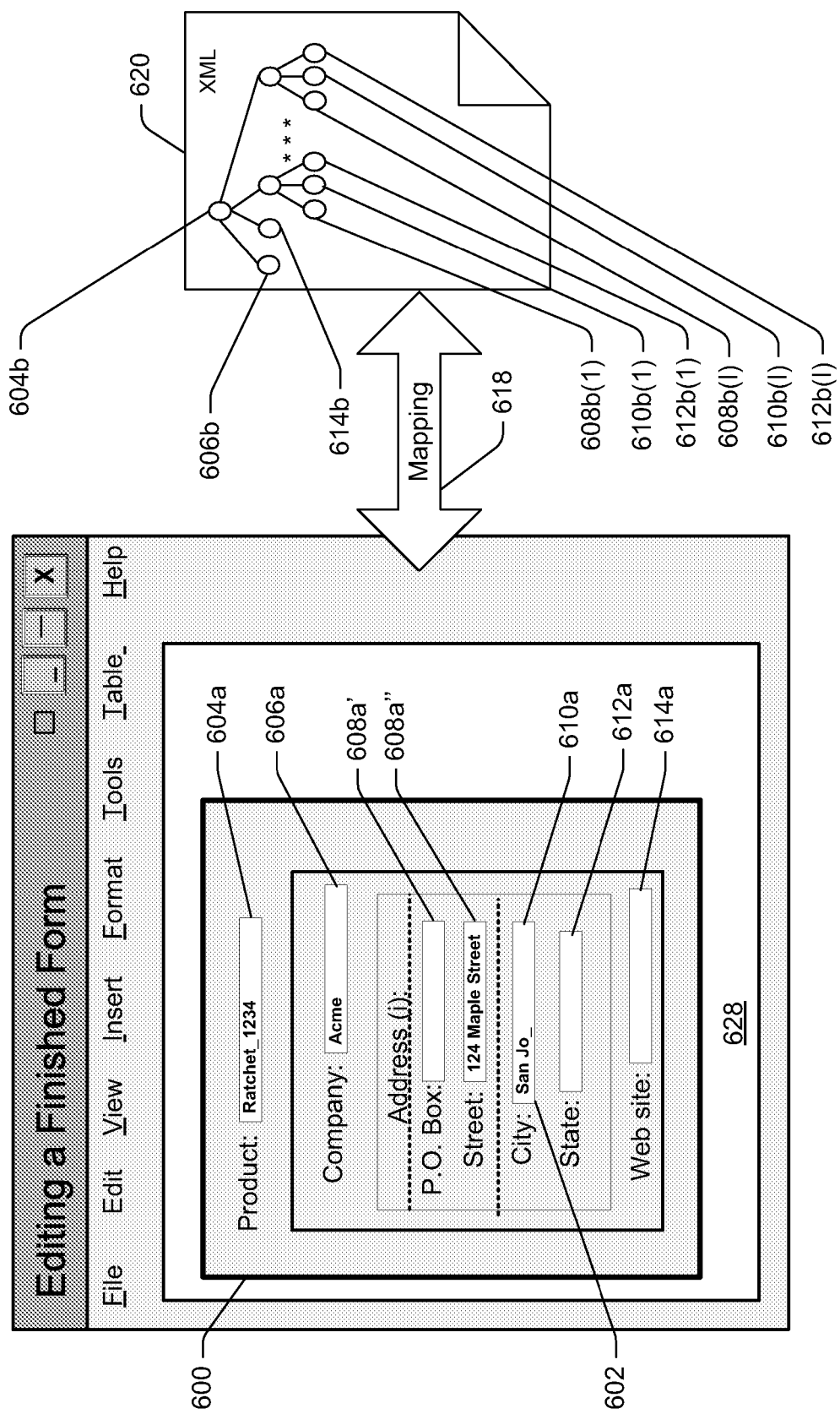
FIG. 6 shows an exemplary user interface (UI) for editing an electronic form.

The creation of the electronic form also creates an associated solution file. The solution file effectively forms a template that can be archived and subsequently used in a business (or other environment). FIG. 6 demonstrates an exemplary use of the exemplary electronic form 600 after it has been created in the design mode of operation of the forms application 510. More specifically, FIG. 6 shows the presentation of the exemplary electronic form 600 in the editing mode of operation of the forms application 510. In this case, the editing user 108 is entering data into the data entry fields in the editing UI 526. For instance, the editing user 108 is currently entering text 602 into a text field 610a. The editing user 108 can select a particular part of the exemplary electronic form 600 in a conventional manner, such as by pointing to and clicking on a particular field in the exemplary electronic form using the mouse device 114.

As described in Section A of this disclosure, data entry fields in the electronic form are mapped to underlying structured XML document 102 in this case, an XML document 620. This mapping is achieved via annotations added to the HTML document used to render the exemplary electronic form 600. More specifically, the annotations act as references which point to particular parts of the XML document 620 associated with the data entry fields in the exemplary electronic form 600. Through this mechanism, the data entered by the editing user 108 is routed back to the XML document 620 and stored in its data structure at appropriate locations. This mapping functionality is represented in FIG. 6 by the arrow 618.

As mentioned above, Section C, below, describes an exemplary method of operation of the implementation described in Section B. This method, in one exemplary implementation, applies an XSLT stylesheet to an XML document to create an HTML view. At least some of the HTML elements in the HTML view are associated with a specifically named attribute. The HTML elements that are associated with the specifically named attribute have respective corresponding XML nodes in the XML document, where the location of each XML node in the XML document is determined by the value of the specifically named attribute. Once edits to the HTML elements associated with the specifically named attribute have been received in an interactive session with an editing user, the received edits are saved back into the nodes in the XML document that respectively correspond to the HTML elements associated with the specifically named attribute.

Referring now to FIGS. 5-7c, electronic form 600 is displayed in the editing UI 526 by the forms application 510 so that an editing user 108 can enter data into the depicted data entry fields of a data entry screen 628. The data entry fields on the data entry screen 628 are being used to collect information for a product catalog. Each product field 604 in the catalog can be sold by zero to an infinite number of companies. The name of each such company can be input at a data entry field 606a. Each company may or may not have a Web site, where the Web site URL is entered at data entry field 614a. Each company can have zero to an infinite number of addresses. Each address has a city data entry field 610a and a state data entry field 612a. Each address can have an alphanumeric entry in either a P.O. Box data entry field 608a' or in a street data entry field 608a" (e.g., one or the other, but not both). Information is kept in a schema associated with the underlying structured XML document 102 represented by the XML document 620 as to what will be considered to be valid data that can be entered into the data entry fields for the electronic form 600. Once validated, these data are then subjected to a mapping operation 618 for entry into the XML document 620. For instance, the Web site URL entered at data entry field 614a may be required to include a "WWW" character string, and to include a suffix character string such as ".com", ".org", ".edu", etc. Other data entry fields may be considered valid only if numeric characters are entered, or only if a capital letter has been entered. Of course, the business logic for validation can be quite varied and can be stored so as to be associated as definitions for the electronic form 600 (i.e., in FIG. 2, see form definition (.XSF) and business logic file 210 for storage of validation criteria).

Reference numeral 602 shows that that characters "San Jo" have been entered into the city address data entry field 610a for the company named "Acme" seen at data entry field 606a, where a street address "124 Maple Street" has been entered at data entry field 608a'. Data entry field 604a indicates that a product called a "Ratchet 1234" is provided through by the "Acme" company that has a particular address that the editing user 108 has entered at data entry fields 608a' and 610a.

Each data entry field has a corresponding place in the XML document 620 seen in FIG. 6. The product name data entry field 604a corresponds to the node 604b in the XML document 620. The Web site data entry field 614a corresponds to the node 614b in the XML document 620. The company name data entry field 606a corresponds to the node 606b in the XML document 620. Multiple addresses can be made for each company, as represented by the address data entry fields 608a'-612, where each company can have from zero to infinity different address data sets. In this case, these address data sets are represented in the XML document 620 by nodes 608b-612b(1-I), where from 1 to "I" different addresses can be provided for each company.

FIG. 7a depicts an Instantiated Content Model (ICM) for the input data <B/><D/><C/> and the content model B (C|D)* E?, where the pipe sign '|' relates mutually exclusive elements and the question mark '?' follows an optional group or element.

Figure 7B:
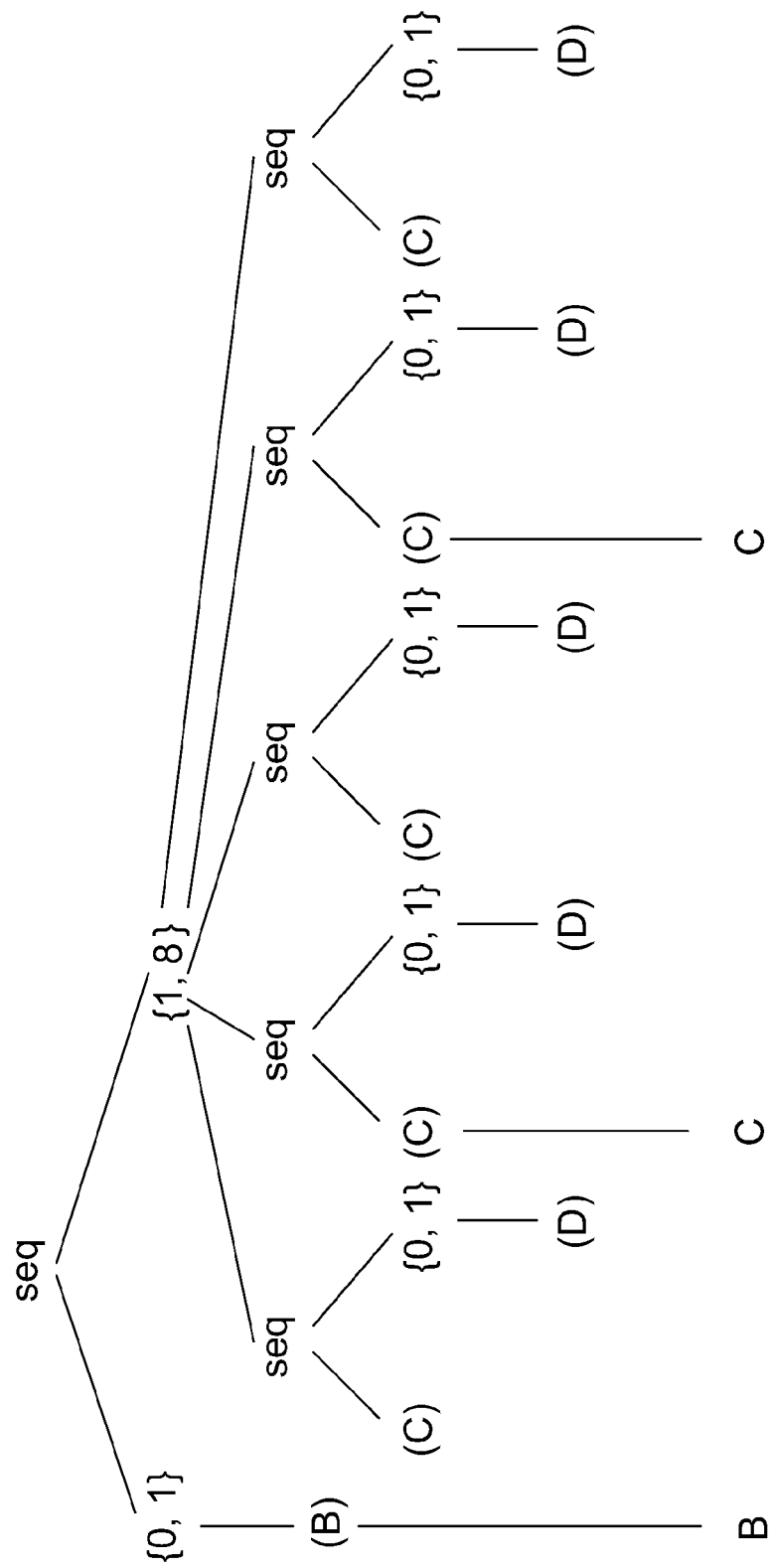
FIG. 7b depicts an ICM for the input data <B/><C/><C/> and the content model B? (C D?).

FIG. 7b depicts an ICM for the input data <B/><C/><C/> and the content model B? (C D?)+, where the plus sign '+' follows a group or element occurring one or more times and the question mark '?' follows an optional group or element. The combination of optional elements in various relations to a repeating group yields a high number of valid insertion points that are represented as uninstantiated nodes in the ICM.

FIG. 7c more particularly illustrates a set of content models that can correspond to the XML document 620. The product is expressed at reference numeral 604b in FIG. 7c as "Product::=(Company Website?)*". The meaning of this expression is that each product can be provided by zero to an infinite number of companies 606b, where each company 606b may or may not have one (1) Web site URL 614b. Each company is expressed at reference numeral 606b in FIG. 7c as "Company::=(City State (PO_Box|Street))*". The meaning of this expression is that each company can have from zero to an infinite number of addresses each of which includes a city 610b, a state 612b, and either a PO Box 608b' or a street address 608b". Note, however, that FIG. 7c represents the number of the address data sets for the PO Box field 608b' and the street address field 608b" as ranging in number from zero to infinity.

FIG. 7a and FIG. 7b show an exemplary notation that is capable of expressing all of the possible fragments for all of the editing controls on the electronic form 600. Use of this notation will avoid the storage requirements otherwise needed to store each possible fragment that can be used when inserting or deleting editing controls on the electronic form 600 as well as support dynamic insertion and deletion of nodes that in the schema are defined using syntactic constructs that group nodes without a common explicit parent (e.g., repeating sequences of nodes).

The received data that is entered into the data-entry fields of the electronic form 600 by the editing user 108 must be valid in order to be associated with corresponding nodes in the XML document 620 in its relationship with the corresponding XML document 102 in accordance with the associated schema 204 (.xsd). Although not shown in FIG. 6, but by way of further example, a data entry field that can be on the electronic form, and into which the editing user 108 can enter data, can include an editing control represented by one or more of the following: a plain text box, a drop-down list box, a list box, a check box, a rich text box, an expression box, an option button, a button, a section with controls, a section, an optional section, an optional section with controls, a repeating section with controls, a repeating section, controls in a layout table, controls, a repeating table, a bulleted list, a numbered list, a plain list, a hyperlink, a date picker, an inline picture, a linked picture, etc. Each editing control can be an Extensible Stylesheet Language (XSLT) component. Schema aware editing code, as described herein, can be used to implement at least some of the foregoing editing controls and can also deal with constructs like optional sequences, choices and recursion.

The structure of each control on the electronic form will correspond to a particular hierarchy of the data in a particular portion of the XML document 620. Thus, if the structure of the portion of hierarchical data in the XML document 620 will allow for multiple fields of data, the forms application 510 will allow for entry in corresponding multiple data entry fields, such as editing controls that will allow for repeating sections and/or a repeating table. Likewise, if the structure of the portion of hierarchical data in the XML document 620 will allow for storage of only textual data, the forms application 510 will allow for entry in a corresponding data entry field of just textual data.

C. Exemplary Method of Operation

Figure 8:
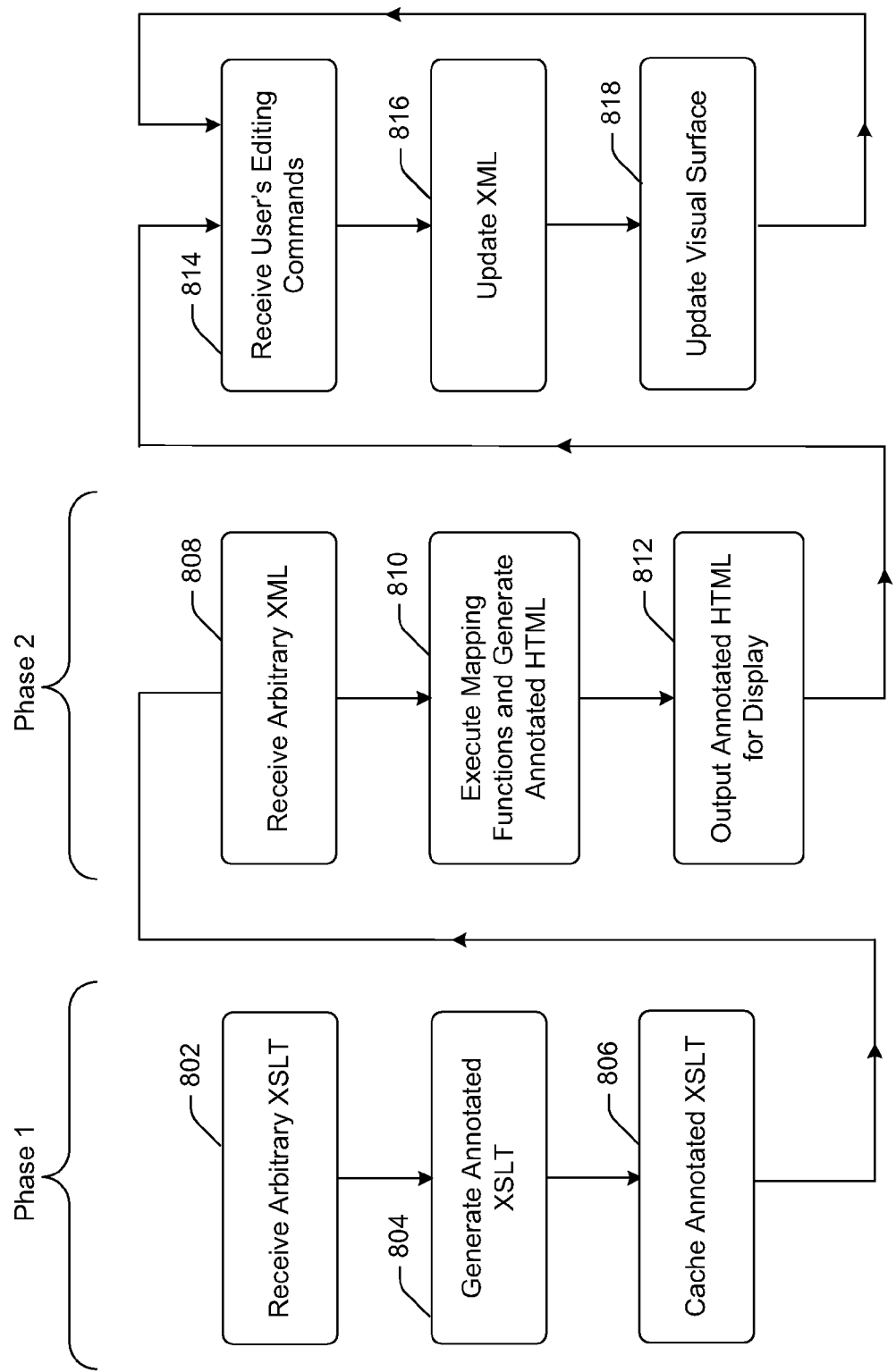
FIG. 8 shows an exemplary procedure for generating annotations in an electronic form that provide mapping back to underlying data, and for subsequently editing the electronic form having those annotations.

FIG. 8 shows an exemplary procedure 800 for creating and editing an electronic form. The procedure 800 can be implemented in software or firmware, or a combination of software and firmware.

Phase 1 of the procedure 800 includes steps 802, 804, and 806. Step 802 involves receiving XSLT information. This step 802 might correspond to receiving an XSLT stylesheet created in response to the creation or modification of an electronic form, or from some other source. The XSLT information is arbitrary in the sense that it does not need to be developed specifically to accommodate the annotation functionality which is subsequently applied to it. An exemplary technique for creating an XSLT file or stylesheet in the context of electronic forms processing is described in commonly assigned U.S. patent application Ser. No. 10/395,506, filed on Mar. 24, 2003, entitled "System and Method for Designing Electronic Forms", which is incorporated herein by reference in its entirety. Step 804 involves automatically annotating the arbitrary XSLT by adding mapping functions to it. As described above, these mapping functions can constitute extension functions added to the XSLT information at inner and outer mapping locations. Step 806 involves caching the annotated XSLT for later retrieval and use. The XSLT author can also manually add mapping functions to the XSLT information to supplement the automatic annotations added to the XSLT information. It can again be mentioned that an XSLT author can modify the XSLT to add custom annotations and some software applications—such as an application capable of designing an electronic form.

Phase 2 of the procedure 800 involves steps 808, 810, and 812. Step 808 entails receiving an XML document to be processed using the annotated XSLT information. The XML document can be considered arbitrary, like the XSLT information, in the sense that it does not have to be structured to accommodate the annotation procedure that is subsequently applied to it; any XML document will suffice. Step 810 entails executing the mapping functions in the annotated XSLT information to return specific reference values that point back to the structured data 102. Step 812 entails outputting an annotated HTML document (or some other markup language document) for display. The HTML document is annotated by including references that point back to respective locations within the structured input data 102.

Following display of the annotated HTML document, the editing user 208 can edit the displayed electronic form. Steps 814, 816, and 818 pertain to this editing operation. In step 814, the forms application 510 receives the editing user 108's commands to execute an editing operation. These commands may be the result of the user pointing to a particular part of the visual surface 106 using the mouse device 114 and then inputting data into data entry fields using the keyboard 112. Other ways of editing the electronic form can be used. Step 816 involves routing the editing user 108's input back to the source XML document 102 for storage at appropriate locations in the structured XML data. To perform this routing, the above-described mapping annotations are used to link selected parts of the visual surface with associated parts of the XML source data. Finally, in step 818, the procedure 800 involves updating the visual surface 106 to reflect the user's editing operations with respect to the visual surface 106. An exemplary technique for performing step 818 is described in commonly assigned application Ser. No. 10/404,312, filed on Mar. 31, 2003, entitled "System and Method for Incrementally Transforming and Rendering Hierarchical Data Files", and incorporated herein by reference in its entirety.

The foregoing descriptions of FIGS. 1-8 provide implementations for making data entry using an exemplary electronic form that is displayed on a display device. As discussed above, the editing is accomplished by use of an HTML view generated by applying an XSLT stylesheet to convert an XML document into the HTML view. During the editing, data is entered into the electronic form at a data-entry field corresponding to an HTML element in the HTML view, where the HTML element is associated a specifically named attribute. The received data entered into the data-entry field of the electronic form is mapped to an XML node in the XML document, where the location of the XML node is determined by the value of the specifically named attribute.

Implementations disclosed herein allow for the expression of all of the possible fragments representing XML nodes that can be inserted in or deleted from the XML document (for example, the XML document 620 seen in FIG. 6) to be considerably reduced in size. This reduction is accomplished, given one of these nodes, by identifying all the nodes of an XML fragment to insert. This identification requires mapping an XML tree node to a representation of its parent's content model, which in turn makes it possible to determine whether the node belongs to a sequence containing other nodes—and in this case, the whole sequence should be deleted to ensure validity and reflect the semantics of the deletion. Then, only the relevant parts of a fragment are used to make an insertion according to the insertion context, or to make a deletion according to the deletion context. This use of only the relevant parts of a fragment involves inserting a variable geometry fragment by identifying the sub-fragment to insert by searching for the highest insertable position below the parent and determining which siblings of this sub-fragment must be inserted/deleted to satisfy the corresponding schema. The XML document can then be modified at the XML node with the received data and the display of the electronic form can be updated to reflect the received data.

The XSLT stylesheet, referenced above, includes conversion functionality that, when applied to the XML document, converts the XML document into the HTML document. Mapping functionality is also included in the XSLT stylesheet to map, and to provide information regarding relationships, between nodes of the XML document and associated nodes of the HTML document. Each node of the HTML document has a specifically named attribute and the location of the node of the XML document that is associated with a corresponding node of the HTML document is determined by the value of the specifically named attribute.

D. Exemplary Computer Environment

FIG. 9 illustrates one example of a computing environment 900 within which the above-described forms application 510 can be either fully or partially implemented. The computing environment 900 includes the general purpose computer 902 and display device 920 discussed in the context of FIG. 9. However, the computing environment 900 can include other kinds of computer and network architectures. For example, although not shown, the computer environment 900 can include hand-held or laptop devices, set top boxes, programmable consumer electronics, mainframe computers, gaming consoles, etc. Further, FIG. 9 shows elements of the computer environment 900 grouped together to facilitate discussion. However, the computing environment 900 can employ a distributed processing configuration. In a distributed computing environment, computing resources can be physically dispersed throughout the environment.

Exemplary computer 902 includes one or more processors or processing units 904, a system memory 906, and a bus 902. The bus 902 connects various system components together. For instance, the bus 902 connects the processor 904 to the system memory 906. The bus 902 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 can also include a variety of computer readable media, including a variety of types of volatile and non-volatile media, each of which can be removable or non-removable. For example, system memory 906 includes computer readable media in the form of volatile memory, such as random access memory (RAM) 904, and non-volatile memory, such as read only memory (ROM) 906. ROM 906 includes an input/output system (BIOS) 908 that contains the basic routines that help to transfer information between elements within computer 902, such as during start-up. RAM 904 typically contains data and/or program modules in a form that can be quickly accessed by processing unit 904.

Other kinds of computer storage media include a hard disk drive 910 for reading from and writing to a non-removable, non-volatile magnetic media, a magnetic disk drive 912 for reading from and writing to a removable, non-volatile magnetic disk 914 (e.g., a "floppy disk"), and an optical disk drive 916 for reading from and/or writing to a removable, non-volatile optical disk 918 such as a CD-ROM, DVD-ROM, or other optical media. The hard disk drive 910, magnetic disk drive 912, and optical disk drive 916 are each connected to the system bus 902 by one or more data media interfaces 920. Alternatively, the hard disk drive 910, magnetic disk drive 912, and optical disk drive 916 can be connected to the system bus 902 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 908, one or more application programs 922 (such as the forms application 510), other program modules 924, and program data 926.

The computer environment 900 can include a variety of input devices. For instance, the computer environment 900 includes the keyboard 112 and a pointing device 114 (e.g., a "mouse") for entering commands and information into computer 902. The computer environment 900 can include other input devices (not illustrated), such as a microphone, joystick, game pad, satellite dish, serial port, scanner, card reading devices, digital or video camera, etc. Input/output interfaces 928 couple the input devices to the processing unit 904. More generally, input devices can be coupled to the computer 902 through any kind of interface and bus structures, such as a parallel port, serial port, game port, universal serial bus (USB) port, etc.

The computer environment 900 also includes the display device 920. A video adapter 930 couples the display device 920 to the bus 902. In addition to the display device 920, the computer environment 900 can include other output peripheral devices, such as speakers (not shown), a printer (not shown), etc.

Computer 902 can operate in a networked environment using logical connections to one or more remote computers, such as a remote computing device 932. The remote computing device 932 can comprise any kind of computer equipment, including a general purpose personal computer, portable computer, a server, a router, a network computer, a peer device or other common network node, etc. Remote computing device 932 can include all of the features discussed above with respect to computer 902, or some subset thereof.

Any type of network can be used to couple the computer 902 with remote computing device 932, such as a local area network (LAN) 934, or a wide area network (WAN) 936 (such as the Internet). When implemented in a LAN networking environment, the computer 902 connects to local network 934 via a network interface or adapter 938. When implemented in a WAN networking environment, the computer 902 can connect to the WAN 936 via a modem 940 or other connection strategy. The modem 940 can be located internal or external to computer 902, and can be connected to the bus 902 via serial I/O interfaces 942 other appropriate coupling mechanism. Although not illustrated, the computing environment 900 can provide wireless communication functionality for connecting computer 902 with remote computing device 932 (e.g., via modulated radio signals, modulated infrared signals, etc.).

In a networked environment, the computer 902 can draw from program modules stored in a remote memory storage device 944. Generally, the depiction of program modules as discrete blocks in FIG. 9 serves only to facilitate discussion; in actuality, the programs modules can be distributed over the computing environment 900, and this distribution can change in a dynamic fashion as the modules are executed by the processing unit 904.

Wherever physically stored, one or more memory modules 906, 914, 918, 944, etc. can be provided to store the forms application 510 programming code.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. For a structured markup language document having a plurality of data entry fields each corresponding to a markup language node, wherein the markup language nodes are arranged in a hierarchical structure of parent nodes having child nodes and wherein the hierarchical position of each said markup language node in the hierarchical structure is expressed as a corresponding fragment of the markup language, a method comprising, for each said parent node:

forming a markup language fragment having a plurality of portions each corresponding to the fragment of a respective said child node without repeating any said fragment of a respective said child node;

adding a mapping function to an Extensible Stylesheet Language Transformation (XSLT) component by an annotation module, at least a first data entry field of the plurality of data entry fields comprising an editing control, the editing control comprising the XSLT component; and using the portions of the markup language fragment respectively corresponding to the child nodes for data entry with the data entry fields, wherein:

the structured markup language document has a syntax described by a schema;

an electronic form definition document encodes schema information from the schema to achieve schema awareness at edit time; and using the portions further comprises using the form definition document having the markup language fragment and the schema information at edit time to determine for each data entry field a corresponding said portion of the markup language fragment to perform data entry for the data entry field, such that data entry for each said data entry field is valid with respect to the schema.

2. The method according to claim 1, wherein two said portions correspond to the longest and the shortest said fragments of respective said child nodes.

3. The method according to claim 1, wherein the formed markup language fragment is smaller than a combination of all possible fragments of the child nodes of the parent node.

4. The method according to claim 1, further comprising entering the data from the data entry into a structured markup language file that corresponds to the structured markup language document, wherein each said data entry field has a corresponding field in the structured markup language file.

5. The method according to claim 1, wherein each said child node has a structure selected from the group consisting of:

a sequence from zero to an infinite number of occurrences of the child node;

from one to an infinite number of occurrences of the child node;

an occurrence of the child node that is conditioned upon an occurrence of another said child node;

an occurrence of the child node that is mutually exclusive to an occurrence of another said child node;

an occurrence of the child node which must occur with an occurrence of another said child node;

a sequence from zero to an infinite number of occurrences of a group of child nodes which must occur together in a prescribed order; and from one to an infinite number of occurrences of a group of child nodes which must occur together in a prescribed order.

6. The method according to claim 1, wherein the structured markup language document is expressed in a markup language selected from the group consisting of Standard Generalized Markup Language (SGML), HyperText Markup Language (HTML), and eXtensible Markup Language (XML).

7. The method according to claim 1, wherein using the schema and the portions of the markup language fragment respectively corresponding to the child nodes for data entry with the data entry fields further comprises displaying an electronic form on a user interface (UI) for interactive data entry with the electronic form.

8. The method according to claim 7, wherein the formed markup language fragment is formed when the electronic form is created.

9. The method according to claim 7, wherein the electronic form has one or more data entry fields each corresponding to one said data entry field of the structured markup language document and into which data can be entered.

10. The method according to claim 7, wherein each said data entry field on the electronic form is an editing control selected from the group consisting of one or more of:

a plain text box;
a drop-down list box;
a list box;
a check box;
a rich text box;
an expression box;
an option button;
a button;
a section with controls;
a section;
an optional section;
an optional section with controls;
a repeating section with controls;
a repeating section;
controls in a layout table;
controls;
a repeating table;
a bulleted list;
a numbered list;
a plain list;
a hyperlink;
a date picker;
an inline picture;
a linked picture;
an optional sequence;
a choice; and
a recursion.

11. The method as defined in claim 10, wherein:
the structured markup language document is expressed in XML;
the electronic form is expressed in Extensible Hypertext Markup Language (XHTML); and
each said editing control is an Extensible Stylesheet Language (XSLT) component.

12. The method as defined in claim 7, wherein forming the markup language fragment further comprises creating the electronic form and associating the markup language fragment with the electronic form.

13. A computer readable medium having machine readable instructions that, when executed by a computer, performs the method of claim 1.

14. A computer readable medium comprising machine readable instructions that, when executed by a computer, perform a method that uses a structured markup language document having a syntax described by a schema, the structured markup language document also having a plurality of data entry fields each corresponding to a markup language node, wherein the markup language nodes are arranged in a hierarchical structure of parent nodes having child nodes, and wherein the hierarchical position of each said markup language node in the hierarchical structure is expressed as a corresponding fragment of the markup language, the method comprising:
displaying an electronic form on a UI for interactive data entry, wherein:
the electronic form has a plurality of data entry fields respectively corresponding to data entry fields of the structured markup language document and into which data can be entered;
at least a first data entry field of the plurality of data entry fields comprises an editing control;
the editing control comprises an Extensible Stylesheet Language Transformation (XSLT) component; and
the electronic form is associated with an electronic form definition document defining for each said parent node a markup language fragment to encode each editable fragment of the parent node, the markup language fragment for each said parent node having a plurality of portions each corresponding to the fragment of a respective said child node of the parent node, wherein:
the electronic form definition document encodes schema information from the schema to achieve schema awareness at edit time;
two said portions correspond to the longest and the shortest said fragments of respective said child nodes; and
the markup language fragment is smaller than a combination of all possible fragments of the child nodes of the parent node;
adding a mapping function to the XSLT component by an annotation module;
for each said parent node, using the form definition document having the markup language fragment and the schema information at edit time to determine for each data entry field a corresponding said portion of the markup language fragment to perform data entry for the data entry field, such that data entry for each said data entry field is valid with respect to the schema.

15. The computer readable medium as defined in claim 14, wherein the method further comprises:
creating the electronic form;
forming the markup language fragment in the electronic form definition document; and
associating the electronic form definition document with the electronic form.

16. The computer readable medium as defined in claim 14, wherein:
the method further comprises entering the data from the data entry into a structured markup language file that corresponds to the structured markup language document; and
each said data entry field has a corresponding field in the structured markup language file.

17. The computer readable medium as defined in claim 14, wherein each said child node has a structure selected from the group consisting of:
from zero to an infinite number of occurrences of the child node;
from one to an infinite number of occurrences of the child node;
an occurrence of the child node that is conditioned upon an occurrence of another said child node;
an occurrence of the child node that is mutually exclusive to an occurrence of another said child node;
an occurrence of the child node with must occur with an occurrence of another said child node;
from zero to an infinite number of occurrences of a group of child nodes which must occur together in a prescribed order; and
from one to an infinite number of occurrences of a group of child nodes which must occur together in a prescribed order.

18. The computer readable medium as defined in claim 14, wherein the structured markup language document is expressed in a markup language selected from the group consisting of Standard Generalized Markup Language (SGML), HyperText Markup Language (HTML), and eXtensible Markup Language (XML).

19. The computer readable medium as defined in claim 14, wherein each said data entry field on the electronic form is an editing control selected from the group consisting of one or more of:
- a plain text box;
- a drop-down list box;
- a list box;
- a check box;
- a rich text box;
- an expression box;
- an option button;
- a button;
- a section with controls;
- a section;
- an optional section;
- an optional section with controls;
- a repeating section with controls;
- a repeating section;
- controls in a layout table;
- controls;
- a repeating table;
- a bulleted list;
- a numbered list;
- a plain list;
- a hyperlink;
- a date picker;
- an inline picture;
- a linked picture;
- an optional sequence;
- a choice; and
- a recursion.

20. The computer readable medium as defined in claim 19, wherein:
the structured markup language document is expressed in XML;
the electronic form is expressed in XHTML; and
each said editing control is an XSLT component.

21. A computer readable medium comprising instructions that, when executed by a computer, perform a method having a step of identifying a hierarchy of markup language nodes that need to be inserted or deleted, and where they need to be inserted, when data is added to or deleted from a structured markup language document, wherein:
the hierarchy of markup language nodes is an expression of all possible fragments of a hierarchical markup language that are to be inserted when rendering the structured markup language document by processing documents containing structured data that is expressed using the hierarchical markup language; and
the expression of all possible fragments is encoded in a manifest file as a single markup language fragment that:
includes respective sub-fragments having the maximum and minimum number of characters each corresponding to one or more said markup language nodes; and
has less characters than a fragment containing all possible fragments; the structured markup language document has a syntax described by a schema;
the manifest file encodes schema information from the schema to achieve schema awareness at edit time; and
the identifying a hierarchy of markup language nodes further comprises using the manifest file having the single markup language fragment and the schema information at edit time to determine a corresponding portion of the single markup language fragment to be inserted or deleted, such that the data added to or deleted from the structured markup language document is valid with respect to the schema.

22. The computer readable medium as defined in claim 21, wherein:
the structured markup language document has a plurality of data entry fields each corresponding to one said markup language node; and
each data entry field is used when data is added to or deleted from the structured markup language document using a corresponding said portion of the single markup language fragment to perform the data entry with the data entry field.

23. The computer readable medium as defined in claim 22, wherein the single markup language fragment does not repeat any of said sub-fragments corresponding to the one or more said markup language nodes.

24. The computer readable medium as defined in claim 22, wherein the method further comprises a step of entering the data from the data entry into a structured markup language file that corresponds to the structured markup language document, wherein each said data entry field has a corresponding field in the structured markup language file.

25. The computer readable medium as defined in claim 21, wherein the structured markup language document is expressed in a markup language selected from the group consisting of Standard Generalized Markup Language (SGML), HyperText Markup Language (HTML), and eXtensible Markup Language (XML).

26. The computer readable medium as defined in claim 22, wherein:
the structured markup language document has a syntax described by a schema; and
the step of using the portions further comprises using the schema and the portions respectively corresponding to the child nodes to make data entry for each said data entry field that is valid with respect to the schema and the respective said portions.

27. The computer readable medium as defined in claim 26, wherein using the manifest file having the single markup language fragment and the schema information further comprises displaying an electronic form on a UI for interactive data entry with the electronic form.

28. The computer readable medium as defined in claim 27, wherein the single markup language fragment that is the expression of all possible fragments is formed when the electronic form is created.

29. The computer readable medium as defined in claim 27, wherein:
the electronic form has one or more data entry fields each corresponding to one said markup language node of the structured markup language document.

30. The computer readable medium as defined in claim 29, wherein each said data entry field on the electronic form is an editing control selected from the group consisting of one or more of:
- a plain text box;
- a drop-down list box;
- a list box;
- a check box;
- a rich text box;
- an expression box;
- an option button;
- a button;
- a section with controls;
- a section;
- an optional section;
- an optional section with controls;
- a repeating section with controls;
- a repeating section;

controls in a layout table;
controls;
a repeating table;
a bulleted list;
a numbered list;
a plain list;
a hyperlink;
a date picker;
an inline picture;
a linked picture;
an optional sequence;
a choice; and
a recursion.

31. The computer readable medium as defined in claim 30, wherein:
the structured markup language document is expressed in XML;
the electronic form is expressed in XHTML; and
each said editing control is an XSLT component.

32. An apparatus comprising:
means for receiving an instruction to open a structured markup language document having a plurality of data entry fields each corresponding to a markup language node, wherein:
the markup language nodes are arranged in a hierarchical structure of parent nodes having child nodes;
the hierarchical position of each said markup language node in the hierarchical structure is expressed as a corresponding fragment of the markup language; and
a markup language fragment is associated via a data set with each said parent node and has a plurality of portions each corresponding to the fragment of a respective said child node without repeating any said fragment of a respective said child node;
means for opening the structured markup language document with the data set that includes a presentation application and a markup-language schema; wherein portions of the structured markup language document are logically coupled with fragments of the markup-language schema, and wherein the data set further comprises a manifest of all file, the manifest encoding said markup language fragments associated with each said parent node and schema information from the markup-language schema to achieve schema awareness at edit time;
means for executing the presentation application to render an electronic form containing data-entry fields respectively associated with:
the coupled portions; and
the data entry fields of the structured markup language document;
means for receiving data entry into the data-entry fields of the electronic form;
means for using, for each said parent node, the portions respectively corresponding to the child nodes for entering data into the structured markup language document as received from the data entry into the data-entry fields of the electronic form;
means for using one or more files in the manifest to represent at least a part of the structured markup language document in the electronic form; and
means for using at edit time one or more files in the manifest to allow a user to input data into the data-entry fields of the electronic form, including
using said markup language fragments and the schema information in the manifest to:
determine for each of the data-entry fields a corresponding said portion of said markup language fragment associated with a respective said parent node to perform data entry for the data entry field; and
validate the data that the user inputs into the one or more data-entry fields of the electronic form with respect to the markup-language schema.

33. The apparatus as defined in claim 32, wherein the markup-language schema does not conform to a recognized standard.

34. The apparatus as defined in claim 32, wherein the markup-language schema defines an arbitrary syntax.

35. The apparatus as defined in claim 32, wherein:
the structured markup language document is written in XML;
the presentation application is written in XSLT;
the electronic form is written in XHTML; and
each said data entry field on the electronic form is an editing control that is an XSLT component.

36. The apparatus as defined in claim 35, wherein each said editing control selected from the group consisting of one or more of:
a plain text box;
a drop-down list box;
a list box;
a check box;
a rich text box;
an expression box;
an option button;
a button;
a section with controls;
a section;
an optional section;
an optional section with controls;
a repeating section with controls;
a repeating section;
controls in a layout table;
controls;
a repeating table;
a bulleted list;
a numbered list;
a plain list;
a hyperlink;
a date picker;
an inline picture;
a linked picture;
an optional sequence;
a choice; and
a recursion.

37. The apparatus as defined in claim 32, wherein each said child node has a structure selected from the group consisting of:
a sequence from zero to an infinite number of occurrences of the child node;
from one to an infinite number of occurrences of the child node;
an occurrence of the child node that is conditioned upon an occurrence of another said child node;
an occurrence of the child node that is mutually exclusive to an occurrence of another said child node;
an occurrence of the child node with must occur with an occurrence of another said child node;
a sequence from zero to an infinite number of occurrences of a group of child nodes which must occur together in a prescribed order; and
from one to an infinite number of occurrences of a group of child nodes which must occur together in a prescribed order.

* * * * *